US011953653B2

United States Patent
(12) Peroz et al.

(10) Patent No.: US 11,953,653 B2
(45) Date of Patent: Apr. 9, 2024

(54) ANTI-REFLECTIVE COATINGS ON OPTICAL WAVEGUIDES

(71) Applicant: Magic Leap, Inc., Plantation,, FL (US)

(72) Inventors: Christophe Peroz, San Francisco,, CA (US); Kevin Messer, Ft. Lauderdale,, FL (US)

(73) Assignee: Magic Leap, Inc., Plantation, FL (US)

( * ) Notice: Subject to any disclaimer, the term of this patent is extended or adjusted under 35 U.S.C. 154(b) by 25 days.

(21) Appl. No.: 17/650,188

(22) Filed: Feb. 7, 2022

(65) Prior Publication Data

US 2022/0163694 A1 May 26, 2022

Related U.S. Application Data

(63) Continuation of application No. 16/214,575, filed on Dec. 10, 2018, now Pat. No. 11,280,937.

(60) Provisional application No. 62/751,240, filed on Oct. 26, 2018, provisional application No. 62/596,904, filed on Dec. 10, 2017.

(51) Int. Cl.

| | |
|---|---|
| ***G02B 1/115*** | (2015.01) |
| ***F21V 8/00*** | (2006.01) |
| ***G02B 5/18*** | (2006.01) |
| ***G02B 27/01*** | (2006.01) |

(52) U.S. Cl.

CPC ............ *G02B 1/115* (2013.01); *G02B 6/0026* (2013.01); *G02B 6/005* (2013.01); *G02B 6/0076* (2013.01); *G02B 27/0172* (2013.01); *G02B 2005/1804* (2013.01); *G02B 6/0065* (2013.01)

(58) Field of Classification Search

CPC ..... G02B 6/005; G02B 6/0056; G02B 6/0075

See application file for complete search history.

(56) References Cited

U.S. PATENT DOCUMENTS

| | | | |
|---|---|---|---|
| 4,344,092 | A | 8/1982 | Miller |
| 4,652,930 | A | 3/1987 | Crawford |
| 4,810,080 | A | 3/1989 | Grendol et al. |

(Continued)

FOREIGN PATENT DOCUMENTS

| | | | |
|---|---|---|---|
| CN | 100416340 | C | 9/2008 |
| CN | 101449270 | A | 6/2009 |

(Continued)

OTHER PUBLICATIONS

"Communication Pursuant to Article 94(3) EPC dated Apr. 25, 2022", European Patent Application No. 18885707.2, (5 pages).

(Continued)

*Primary Examiner* — Robert E. Tallman

(74) *Attorney, Agent, or Firm* — Stephen M. De Klerk

(57) ABSTRACT

An anti-reflective waveguide assembly comprising a waveguide substrate having a first index of refraction, a plurality of diffractive optical elements disposed upon a first surface of the waveguide and an anti-reflective coating disposed upon a second surface of the waveguide. The anti-reflective coating preferably increases absorption of light through a surface to which it is applied into the waveguide so that at least 97 percent of the light is transmitted. The anti-reflective coating is composed of four layers of material having different indices of refraction that the first index of refraction and an imaginary refractive index less than $1\times10^{-3}$ but preferably less than $5\times10^{-4}$.

25 Claims, 12 Drawing Sheets

(56) References Cited

U.S. PATENT DOCUMENTS 4,997,268 A 3/1991 Dauvergne
5,007,727 A 4/1991 Kahaney et al.
5,074,295 A 12/1991 Willis
5,240,220 A 8/1993 Elberbaum
5,251,635 A 10/1993 Dumoulin et al.
5,410,763 A 5/1995 Bolle
5,455,625 A 10/1995 Englander
5,495,286 A 2/1996 Adair
5,497,463 A 3/1996 Stein et al.
5,659,701 A 8/1997 Amit et al.
5,682,255 A 10/1997 Friesem et al.
5,689,669 A 11/1997 Lynch
5,826,092 A 10/1998 Flannery
5,854,872 A 12/1998 Tai
5,864,365 A 1/1999 Sramek et al.
5,937,202 A 8/1999 Crosetto
6,002,853 A 12/1999 De Hond
6,012,811 A 1/2000 Chao et al.
6,016,160 A 1/2000 Coombs et al.
6,064,749 A 5/2000 Hirota et al.
6,076,927 A 6/2000 Owens
6,079,982 A 6/2000 Meader
6,117,923 A 9/2000 Amagai et al.
6,119,147 A 9/2000 Toomey et al.
6,124,977 A 9/2000 Takahashi
6,179,619 B1 1/2001 Tanaka
6,191,809 B1 2/2001 Hori et al.
6,219,045 B1 4/2001 Leahy et al.
6,243,091 B1 6/2001 Berstis
6,271,843 B1 8/2001 Lection et al.
6,362,817 B1 3/2002 Powers et al.
6,375,369 B1 4/2002 Schneider et al.
6,385,735 B1 5/2002 Wilson
6,396,522 B1 5/2002 Vu
6,414,679 B1 7/2002 Miodonski et al.
6,538,655 B1 3/2003 Kubota
6,541,736 B1 4/2003 Huang et al.
6,570,563 B1 5/2003 Honda
6,573,903 B2 6/2003 Gantt
6,590,593 B1 7/2003 Robertson et al.
6,621,508 B1 9/2003 Shiraishi et al.
6,690,393 B2 2/2004 Heron et al.
6,757,068 B2 6/2004 Foxlin
6,784,901 B1 8/2004 Harvfey et al.
6,961,055 B2 11/2005 Doak
7,046,515 B1 5/2006 Wyatt
7,051,219 B2 5/2006 Hwang
7,076,674 B2 7/2006 Cervantes
7,111,290 B1 9/2006 Yates, Jr.
7,119,819 B1 10/2006 Robertson et al.
7,219,245 B1 5/2007 Raghuvanshi
7,382,288 B1 6/2008 Wilson
7,414,629 B2 8/2008 Santodomingo
7,431,453 B2 10/2008 Hogan
7,467,356 B2 12/2008 Gettman et al.
7,542,040 B2 6/2009 Templeman
7,573,640 B2 8/2009 Nivon et al.
7,653,877 B2 1/2010 Matsuda
7,663,625 B2 2/2010 Chartier et al.
7,724,980 B1 5/2010 Shenzhi
7,746,343 B1 6/2010 Charaniya et al.
7,751,662 B2 7/2010 Kleemann
7,758,185 B2 7/2010 Lewis
7,788,323 B2 8/2010 Greenstein et al.
7,804,507 B2 9/2010 Yang et al.
7,814,429 B2 10/2010 Buffet et al.
7,817,150 B2 10/2010 Reichard et al.
7,844,724 B2 11/2010 Van Wie et al.
8,060,759 B1 11/2011 Arnan et al.
8,120,851 B2 2/2012 Iwasa
8,214,660 B2 7/2012 Capps, Jr.
8,246,408 B2 8/2012 Elliot
8,353,594 B2 1/2013 Lewis
8,360,578 B2 1/2013 Nummela et al.
8,508,676 B2 8/2013 Silverstein et al.
8,547,638 B2 10/2013 Levola
8,605,764 B1 10/2013 Rothaar et al.
8,619,365 B2 * 12/2013 Harris .................... G02B 1/115 359/359
8,696,113 B2 4/2014 Lewis
8,698,701 B2 4/2014 Margulis
8,733,927 B1 5/2014 Lewis
8,736,636 B2 5/2014 Kang
8,759,929 B2 6/2014 Shiozawa et al.
8,793,770 B2 7/2014 Lim
8,823,855 B2 9/2014 Hwang
8,847,988 B2 9/2014 Geisner et al.
8,874,673 B2 10/2014 Kim
9,010,929 B2 4/2015 Lewis
9,015,501 B2 4/2015 Gee
9,086,537 B2 7/2015 Iwasa et al.
9,095,437 B2 8/2015 Boyden et al.
9,239,473 B2 1/2016 Lewis
9,244,293 B2 1/2016 Lewis
9,244,533 B2 1/2016 Friend et al.
9,383,823 B2 7/2016 Geisner et al.
9,489,027 B1 11/2016 Ogletree
9,519,305 B2 12/2016 Wolfe
9,581,820 B2 2/2017 Robbins
9,582,060 B2 2/2017 Balatsos
9,658,473 B2 5/2017 Lewis
9,671,566 B2 6/2017 Abovitz et al.
9,671,615 B1 6/2017 Vallius et al.
9,696,795 B2 7/2017 Marcolina et al.
9,798,144 B2 10/2017 Sako et al.
9,874,664 B2 1/2018 Stevens et al.
9,880,441 B1 1/2018 Osterhout
9,918,058 B2 3/2018 Takahasi et al.
9,955,862 B2 5/2018 Freeman et al.
9,978,118 B1 5/2018 Ozgumer et al.
9,996,797 B1 6/2018 Holz et al.
10,018,844 B2 7/2018 Levola et al.
10,082,865 B1 9/2018 Raynal et al.
10,151,937 B2 12/2018 Lewis
10,185,147 B2 1/2019 Lewis
10,218,679 B1 2/2019 Jawahar
10,241,545 B1 3/2019 Richards et al.
10,317,680 B1 6/2019 Richards et al.
10,436,594 B2 10/2019 Belt et al.
10,516,853 B1 12/2019 Gibson et al.
10,551,879 B1 2/2020 Richards et al.
10,578,870 B2 3/2020 Kimmel
10,698,202 B2 6/2020 Kimmel et al.
10,856,107 B2 10/2020 Mycek et al.
10,825,424 B2 11/2020 Zhang
10,987,176 B2 4/2021 Poltaretskyi et al.
11,190,681 B1 11/2021 Brook et al.
11,209,656 B1 12/2021 Choi et al.
11,236,993 B1 2/2022 Hall et al.
2001/0010598 A1 8/2001 Aritake et al.
2001/0018667 A1 8/2001 Kim
2002/0007463 A1 1/2002 Fung
2002/0108064 A1 2/2002 Nunally
2002/0063913 A1 5/2002 Nakamura et al.
2002/0071050 A1 6/2002 Homberg
2002/0095463 A1 7/2002 Matsuda
2002/0113820 A1 8/2002 Robinson et al.
2002/0122648 A1 9/2002 Mule'et al.
2002/0140848 A1 10/2002 Cooper et al.
2003/0028816 A1 2/2003 Bacon
2003/0048456 A1 3/2003 Hill
2003/0067685 A1 4/2003 Niv
2003/0077458 A1 * 4/2003 Korenaga .............. G02B 1/115 428/432
2003/0115494 A1 6/2003 Cervantes
2003/0218614 A1 11/2003 Lavelle et al.
2003/0219992 A1 11/2003 Schaper
2003/0226047 A1 12/2003 Park
2004/0001533 A1 1/2004 Tran et al.
2004/0021600 A1 2/2004 Wittenberg
2004/0025069 A1 2/2004 Gary et al.
2004/0042377 A1 3/2004 Nikoloai et al.
2004/0073822 A1 4/2004 Greco
2004/0073825 A1 4/2004 Itoh

(56) References Cited

U.S. PATENT DOCUMENTS

2004/0111248 A1 6/2004 Granny et al.
2004/0113887 A1 6/2004 Pair et al.
2004/0174496 A1 9/2004 Ji et al.
2004/0186902 A1 9/2004 Stewart
2004/0193441 A1 9/2004 Altieri
2004/0201857 A1 10/2004 Foxlin
2004/0238732 A1 12/2004 State et al.
2004/0240072 A1 12/2004 Schindler et al.
2004/0246391 A1 12/2004 Travis
2004/0268159 A1 12/2004 Aasheim et al.
2005/0001977 A1 1/2005 Zelman
2005/0034002 A1 2/2005 Flautner
2005/0093719 A1 5/2005 Okamoto et al.
2005/0128212 A1 6/2005 Edecker et al.
2005/0157159 A1 7/2005 Komiya et al.
2005/0177385 A1 8/2005 Hull
2005/0231599 A1 10/2005 Yamasaki
2005/0273792 A1 12/2005 Inohara et al.
2006/0013435 A1 1/2006 Rhoads
2006/0015821 A1 1/2006 Jacques Parker et al.
2006/0019723 A1 1/2006 Vorenkamp
2006/0038880 A1 2/2006 Starkweather et al.
2006/0050224 A1 3/2006 Smith
2006/0090092 A1 4/2006 Verhulst
2006/0126181 A1 6/2006 Levola
2006/0129852 A1 6/2006 Bonola
2006/0132914 A1 6/2006 Weiss et al.
2006/0179329 A1 8/2006 Terechko
2006/0221448 A1 10/2006 Nivon et al.
2006/0228073 A1 10/2006 Mukawa et al.
2006/0250322 A1 11/2006 Hall et al.
2006/0259621 A1 11/2006 Ranganathan
2006/0268220 A1 11/2006 Hogan
2007/0058248 A1 3/2007 Nguyen et al.
2007/0103836 A1 5/2007 Oh
2007/0124730 A1 5/2007 Pytel
2007/0159673 A1 7/2007 Freeman et al.
2007/0188837 A1 8/2007 Shimizu et al.
2007/0198886 A1 8/2007 Saito
2007/0204672 A1 9/2007 Huang et al.
2007/0213952 A1 9/2007 Cirelli
2007/0283247 A1 12/2007 Brenneman et al.
2008/0002259 A1 1/2008 Ishizawa et al.
2008/0002260 A1 1/2008 Arrouy et al.
2008/0030429 A1 2/2008 Hailpern
2008/0043334 A1 2/2008 Itzkovitch et al.
2008/0046773 A1 2/2008 Ham
2008/0063802 A1 3/2008 Maula et al.
2008/0068557 A1 3/2008 Menduni et al.
2008/0125218 A1 5/2008 Collins
2008/0146942 A1 6/2008 Dala-Krishna
2008/0173036 A1 7/2008 Willaims
2008/0177506 A1 7/2008 Kim
2008/0205838 A1 8/2008 Crippa et al.
2008/0215907 A1 9/2008 Wilson
2008/0225393 A1 9/2008 Rinko
2008/0235570 A1 9/2008 Sawada et al.
2008/0246693 A1 10/2008 Hailpern et al.
2008/0316768 A1 12/2008 Travis
2009/0076791 A1 3/2009 Rhoades et al.
2009/0091583 A1 4/2009 McCoy
2009/0153797 A1 6/2009 Allon et al.
2009/0224416 A1 9/2009 Laakkonen et al.
2009/0245730 A1 10/2009 Kleemann
2009/0287728 A1 11/2009 Martine et al.
2009/0300528 A1 12/2009 Stambaugh
2009/0310633 A1 12/2009 Ikegami
2010/0005326 A1 1/2010 Archer
2010/0019962 A1 1/2010 Fujita
2010/0056274 A1 3/2010 Uusitalo et al.
2010/0063854 A1 3/2010 Purvis et al.
2010/0070378 A1 3/2010 Trotman et al.
2010/0079841 A1 4/2010 Levola
2010/0115428 A1 5/2010 Shuping et al.
2010/0153934 A1 6/2010 Lachner
2010/0194632 A1 8/2010 Raento et al.
2010/0205541 A1 8/2010 Rappaport et al.
2010/0214284 A1 8/2010 Rieffel et al.
2010/0232016 A1 9/2010 Landa et al.
2010/0232031 A1 9/2010 Batchko et al.
2010/0244168 A1 9/2010 Shiozawa et al.
2010/0274567 A1 10/2010 Carlson et al.
2010/0274627 A1 10/2010 Carlson
2010/0277803 A1 11/2010 Pockett et al.
2010/0284085 A1 11/2010 Laakkonen
2010/0296163 A1 11/2010 Sarikko
2010/0309687 A1 12/2010 Sampsell et al.
2011/0010636 A1 1/2011 Hamilton, II et al.
2011/0021263 A1 1/2011 Anderson et al.
2011/0022870 A1 1/2011 Mcgrane
2011/0041083 A1 2/2011 Gabai et al.
2011/0050640 A1 3/2011 Lundback et al.
2011/0050655 A1 3/2011 Mukawa
2011/0122240 A1 5/2011 Becker
2011/0145617 A1 6/2011 Thomson et al.
2011/0170801 A1 7/2011 Lu et al.
2011/0218733 A1 9/2011 Hamza et al.
2011/0286735 A1 11/2011 Temblay
2011/0291969 A1 12/2011 Rashid et al.
2012/0011389 A1 1/2012 Driesen
2012/0050535 A1 3/2012 Densham et al.
2012/0075501 A1 3/2012 Oyagi et al.
2012/0081392 A1 4/2012 Arthur
2012/0089854 A1 4/2012 Breakstone
2012/0113235 A1 5/2012 Shintani
2012/0127062 A1 5/2012 Bar-Zeev et al.
2012/0154557 A1 6/2012 Perez et al.
2012/0215094 A1 8/2012 Rahimian et al.
2012/0218301 A1 8/2012 Miller
2012/0246506 A1 9/2012 Knight
2012/0249416 A1 10/2012 Maciocci et al.
2012/0249741 A1 10/2012 Maciocci et al.
2012/0260083 A1 10/2012 Andrews
2012/0307075 A1 12/2012 Margalitq
2012/0307362 A1 12/2012 Silverstein et al.
2012/0314959 A1 12/2012 White et al.
2012/0320460 A1 12/2012 Levola
2012/0326948 A1 12/2012 Crocco et al.
2013/0021486 A1 1/2013 Richardon
2013/0050258 A1 2/2013 Liu et al.
2013/0050642 A1 2/2013 Lewis et al.
2013/0050833 A1 2/2013 Lewis et al.
2013/0051730 A1 2/2013 Travers et al.
2013/0061240 A1 3/2013 Yan et al.
2013/0077049 A1 3/2013 Bohn
2013/0077170 A1 3/2013 Ukuda
2013/0094148 A1 4/2013 Sloane
2013/0129282 A1 5/2013 Li
2013/0162940 A1 6/2013 Kurtin et al.
2013/0169923 A1 7/2013 Schnoll et al.
2013/0205126 A1 8/2013 Kruglick
2013/0222386 A1 8/2013 Tannhauser et al.
2013/0268257 A1 10/2013 Hu
2013/0278633 A1 10/2013 Ahn et al.
2013/0314789 A1 11/2013 Saarikko et al.
2013/0318276 A1 11/2013 Dalal
2013/0336138 A1 12/2013 Venkatraman et al.
2013/0342564 A1 12/2013 Kinnebrew et al.
2013/0342570 A1 12/2013 Kinnebrew et al.
2013/0342571 A1 12/2013 Kinnebrew et al.
2013/0343408 A1 12/2013 Cook
2014/0002329 A1 1/2014 Nishimaki et al.
2014/0013098 A1 1/2014 Yeung
2014/0016821 A1 1/2014 Arth et al.
2014/0022819 A1 1/2014 Oh et al.
2014/0078023 A1 3/2014 Ikeda et al.
2014/0082526 A1 3/2014 Park et al.
2014/0119598 A1 5/2014 Ramachandran et al.
2014/0126769 A1 5/2014 Reitmayr et al.
2014/0140653 A1* 5/2014 Brown ................ G02B 6/0033
385/10
2014/0149573 A1 5/2014 Tofighbakhsh et al.
2014/0168260 A1 6/2014 O'Brien et al.
2014/0244983 A1 8/2014 McDonald et al.

(56) References Cited

U.S. PATENT DOCUMENTS

2014/0266987 A1 9/2014 Magyari
2014/0267419 A1 9/2014 Ballard et al.
2014/0274391 A1 9/2014 Stafford
2014/0282105 A1 9/2014 Nordstrom
2014/0313228 A1 10/2014 Kasahara
2014/0340449 A1 11/2014 Plagemann et al.
2014/0359589 A1 12/2014 Kodsky et al.
2014/0375680 A1 12/2014 Ackerman et al.
2015/0005785 A1 1/2015 Olson
2015/0009099 A1 1/2015 Queen
2015/0077312 A1 3/2015 Wang
2015/0097719 A1 4/2015 Balachandreswaran et al.
2015/0123966 A1 5/2015 Newman
2015/0130790 A1 5/2015 Vazquez,II et al.
2015/0134995 A1 5/2015 Park et al.
2015/0138248 A1 5/2015 Schrader
2015/0155939 A1 6/2015 Oshima et al.
2015/0168221 A1 6/2015 Mao et al.
2015/0205126 A1 7/2015 Schowengerdt
2015/0235427 A1 8/2015 Nobori et al.
2015/0235431 A1 8/2015 Schowengerdt
2015/0253651 A1 9/2015 Russell et al.
2015/0256484 A1 9/2015 Cameron
2015/0269784 A1 9/2015 Miyawaki et al.
2015/0294483 A1 10/2015 Wells et al.
2015/0301955 A1 10/2015 Yakovenko et al.
2015/0310657 A1 10/2015 Eden
2015/0338915 A1 11/2015 Publicover et al.
2015/0355481 A1 12/2015 Hilkes et al.
2016/0004102 A1 1/2016 Nisper et al.
2016/0015470 A1 1/2016 Border
2016/0027215 A1 1/2016 Burns et al.
2016/0033770 A1 2/2016 Fujimaki et al.
2016/0051217 A1 2/2016 Douglas et al.
2016/0077338 A1 3/2016 Robbins et al.
2016/0085285 A1 3/2016 Mangione-Smith
2016/0085300 A1 3/2016 Robbins et al.
2016/0091720 A1 3/2016 Stafford et al.
2016/0093099 A1 3/2016 Bridges
2016/0093269 A1 3/2016 Buckley et al.
2016/0103326 A1 4/2016 Kimura et al.
2016/0123745 A1 5/2016 Cotier et al.
2016/0139402 A1 5/2016 Lapstun
2016/0139411 A1 5/2016 Kang et al.
2016/0155273 A1 6/2016 Lyren et al.
2016/0180596 A1 6/2016 Gonzalez del Rosario
2016/0187654 A1 6/2016 Border et al.
2016/0191887 A1 6/2016 Casas
2016/0202496 A1 7/2016 Billetz et al.
2016/0217624 A1 7/2016 Finn et al.
2016/0266412 A1 9/2016 Yoshida
2016/0267708 A1 9/2016 Nistico et al.
2016/0274733 A1 9/2016 Hasegawa et al.
2016/0287337 A1 10/2016 Aram et al.
2016/0300388 A1 10/2016 Stafford et al.
2016/0321551 A1 11/2016 Priness et al.
2016/0327798 A1 11/2016 Xiao et al.
2016/0334279 A1 11/2016 Mittleman et al.
2016/0357255 A1 12/2016 Lindh et al.
2016/0370404 A1 12/2016 Quadrat et al.
2016/0370510 A1 12/2016 Thomas
2017/0038607 A1 2/2017 Camara
2017/0060225 A1 3/2017 Zha et al.
2017/0061696 A1 3/2017 Li et al.
2017/0064066 A1 3/2017 Das et al.
2017/0100664 A1 4/2017 Osterhout et al.
2017/0102544 A1 4/2017 Vallius et al.
2017/0115487 A1 4/2017 Travis
2017/0122725 A1 5/2017 Yeoh et al.
2017/0123526 A1 5/2017 Trail et al.
2017/0127295 A1 5/2017 Black et al.
2017/0131569 A1 5/2017 Aschwanden et al.
2017/0147066 A1 5/2017 Katz et al.
2017/0160518 A1 6/2017 Lanman et al.
2017/0161951 A1 6/2017 Fix et al.
2017/0185261 A1 6/2017 Perez et al.
2017/0192239 A1 7/2017 Nakamura et al.
2017/0201709 A1 7/2017 Igarashi et al.
2017/0205903 A1 7/2017 Miller et al.
2017/0206668 A1 7/2017 Poulos et al.
2017/0213388 A1 7/2017 Margolis et al.
2017/0214907 A1 7/2017 Lapstun
2017/0219841 A1 8/2017 Popovich et al.
2017/0232345 A1 8/2017 Rofougaran et al.
2017/0235126 A1 8/2017 DiDomenico
2017/0235129 A1 8/2017 Kamakura
2017/0235142 A1 8/2017 Wall et al.
2017/0235144 A1 8/2017 Piskunov et al.
2017/0235147 A1 8/2017 Kamakura
2017/0243403 A1 8/2017 Daniels et al.
2017/0246070 A1 8/2017 Osterhout et al.
2017/0254832 A1 9/2017 Ho et al.
2017/0256096 A1 9/2017 Faaborg et al.
2017/0258526 A1 9/2017 Lang
2017/0266529 A1 9/2017 Reikmoto
2017/0270712 A1 9/2017 Tyson et al.
2017/0281054 A1 10/2017 Stever et al.
2017/0287376 A1 10/2017 Bakar et al.
2017/0293141 A1 10/2017 Schowengerdt et al.
2017/0307886 A1 10/2017 Stenberg et al.
2017/0307891 A1 10/2017 Bucknor et al.
2017/0312032 A1 11/2017 Amanatullah et al.
2017/0322418 A1 11/2017 Liu et al.
2017/0322426 A1 11/2017 Tervo
2017/0329137 A1 11/2017 Tervo
2017/0332098 A1 11/2017 Rusanovskyy et al.
2017/0336636 A1 11/2017 Amitai et al.
2017/0357332 A1 12/2017 Balan et al.
2017/0363871 A1 12/2017 Vallius
2017/0371394 A1 12/2017 Chan
2017/0371661 A1 12/2017 Sparling
2018/0014266 A1 1/2018 Chen
2018/0024289 A1 1/2018 Fattal
2018/0044173 A1 2/2018 Netzer
2018/0052007 A1 2/2018 Teskey et al.
2018/0052501 A1 2/2018 Jones, Jr. et al.
2018/0059305 A1* 3/2018 Popovich ........... G02B 27/0101
2018/0067779 A1 3/2018 Pillalamarri et al.
2018/0070855 A1 3/2018 Eichler
2018/0082480 A1 3/2018 White et al.
2018/0084245 A1 3/2018 Lapstun
2018/0088185 A1 3/2018 Woods et al.
2018/0102981 A1 4/2018 Kurtzman et al.
2018/0108179 A1 4/2018 Tomlin et al.
2018/0114298 A1 4/2018 Malaika et al.
2018/0129112 A1 5/2018 Osterhout
2018/0131907 A1 5/2018 Schmirler et al.
2018/0136466 A1 5/2018 Ko
2018/0144691 A1 5/2018 Choi et al.
2018/0150971 A1 5/2018 Adachi et al.
2018/0151796 A1 5/2018 Akahane
2018/0172995 A1 6/2018 Lee et al.
2018/0188115 A1 7/2018 Hsu et al.
2018/0189568 A1 7/2018 Powderly et al.
2018/0190017 A1 7/2018 Mendez et al.
2018/0191990 A1 7/2018 Motoyama et al.
2018/0217395 A1 8/2018 Lin et al.
2018/0218545 A1 8/2018 Garcia et al.
2018/0250589 A1 9/2018 Cossairt et al.
2018/0260218 A1 9/2018 Gopal
2018/0284877 A1 10/2018 Klein
2018/0292654 A1 10/2018 Wall et al.
2018/0299678 A1 10/2018 Singer et al.
2018/0357472 A1 12/2018 Dreessen
2019/0005069 A1 1/2019 Filgueiras de Araujo et al.
2019/0011691 A1 1/2019 Peyman
2019/0056591 A1* 2/2019 Tervo .................. G02B 6/0016
2019/0087015 A1 3/2019 Lam et al.
2019/0101758 A1 4/2019 Zhu et al.
2019/0107723 A1 4/2019 Lee et al.
2019/0137788 A1 5/2019 Suen
2019/0155034 A1 5/2019 Singer et al.
2019/0155439 A1 5/2019 Mukherjee et al.
2019/0158926 A1 5/2019 Kang et al.

(56) References Cited

U.S. PATENT DOCUMENTS

2019/0162950 A1 5/2019 Lapstun
2019/0167095 A1 6/2019 Krueger
2019/0172216 A1 6/2019 Ninan et al.
2019/0178654 A1 6/2019 Hare
2019/0182415 A1 6/2019 Sivan
2019/0196690 A1 6/2019 Chong et al.
2019/0206116 A1 7/2019 Xu et al.
2019/0219815 A1 7/2019 Price et al.
2019/0243123 A1 8/2019 Bohn
2019/0287270 A1 9/2019 Nakamura et al.
2019/0318502 A1 10/2019 He et al.
2019/0318540 A1 10/2019 Piemonte et al.
2019/0321728 A1 10/2019 Imai et al.
2019/0347853 A1 11/2019 Chen et al.
2019/0380792 A1 12/2019 Poltaretskyi et al.
2019/0388182 A1 12/2019 Kumar et al.
2020/0066045 A1 2/2020 Stahl et al.
2020/0098188 A1 3/2020 Bar-Zeev et al.
2020/0100057 A1 3/2020 Galon et al.
2020/0110928 A1 4/2020 Al Jazaery et al.
2020/0117267 A1 4/2020 Gibson et al.
2020/0117270 A1 4/2020 Gibson et al.
2020/0184217 A1 6/2020 Faulkner
2020/0184653 A1 6/2020 Faulker
2020/0202759 A1 6/2020 Ukai et al.
2020/0242848 A1 7/2020 Ambler et al.
2020/0309944 A1 10/2020 Thoresen et al.
2020/0356161 A1 11/2020 Wagner
2020/0368616 A1 11/2020 Delamont
2020/0391115 A1 12/2020 Leeper et al.
2020/0409528 A1 12/2020 Lee
2021/0008413 A1 1/2021 Asikainen et al.
2021/0033871 A1 2/2021 Jacoby et al.
2021/0041951 A1 2/2021 Gibson et al.
2021/0053820 A1 2/2021 Gurin et al.
2021/0093391 A1 4/2021 Poltaretskyi et al.
2021/0093410 A1 4/2021 Gaborit et al.
2021/0093414 A1 4/2021 Moore et al.
2021/0097886 A1 4/2021 Kuester et al.
2021/0132380 A1 5/2021 Wieczorek
2021/0141225 A1 5/2021 Meynen et al.
2021/0142582 A1 5/2021 Jones et al.
2021/0158627 A1 5/2021 Cossairt et al.
2021/0173480 A1 6/2021 Osterhout et al.
2022/0366598 A1 11/2022 Azimi et al.

FOREIGN PATENT DOCUMENTS

CN 104040410 A 9/2014
CN 104603675 A 5/2015
CN 105938426 A 9/2016
CN 106662754 A 5/2017
CN 107683497 A1 2/2018
CN 109223121 A 1/2019
CN 105190427 B 11/2019
EP 0504930 A1 3/1992
EP 0535402 A1 4/1993
EP 0632360 A1 1/1995
EP 1215522 A2 6/2002
EP 1494110 A2 1/2005
EP 1938141 A1 7/2008
EP 1943556 A2 7/2008
EP 2290428 A2 3/2011
EP 2350774 A1 8/2011
EP 1237067 B1 1/2016
EP 3139245 A1 3/2017
EP 3164776 B1 5/2017
EP 3236211 A1 10/2017
EP 2723240 B1 8/2018
EP 2896986 B1 2/2021
GB 2499635 A 8/2013
GB 2542853 A 4/2017
IN 938/DEL/2004 A 6/2006
JP H03-036974 U 4/1991
JP H10-333094 A 12/1998
JP 2002-529806 9/2002
JP 2003-029198 A 1/2003
JP 2003-141574 A 5/2003
JP 2003-228027 A 8/2003
JP 2003-329873 A 11/2003
JP 2005-303843 A 10/2005
JP 2007-012530 A 1/2007
JP 2007-86696 A 4/2007
JP 2007-273733 A 10/2007
JP 2008-257127 A 10/2008
JP 2009-090689 A 4/2009
JP 2009-244869 A 10/2009
JP 2010-014443 A 1/2010
JP 2010-139575 6/2010
JP 2011-033993 A 2/2011
JP 2011-257203 A 12/2011
JP 2011-530131 A 12/2011
JP 2012-015774 A 1/2012
JP 2012-235036 A 11/2012
JP 2013-525872 A1 6/2013
JP 2014-500522 A 1/2014
JP 2014-192550 A 10/2014
JP 2015-191032 A 11/2015
JP 2016-502120 A 1/2016
JP 2016-85463 A 5/2016
JP 2016-516227 A 6/2016
JP 2016-126134 A 7/2016
JP 2017-015697 A 1/2017
JP 2017-153498 9/2017
JP 2017-531840 A 10/2017
JP 2017-535825 A 11/2017
JP 6232763 B2 11/2017
JP 6333965 B2 5/2018
KR 2005-0010775 A 1/2005
KR 10-2006-0059992 A 6/2006
KR 10-1372623 B1 3/2014
TW 201219829 A 5/2012
TW 201803289 A 1/2018
WO 1991/000565 A2 1/1991
WO 2000/030368 A1 6/2000
WO 2002/071315 A2 9/2002
WO 2004095248 A 11/2004
WO 2006132614 A1 12/2006
WO 2007041678 A2 4/2007
WO 2007/037089 A1 5/2007
WO 2007/085628 A1 8/2007
WO 2007/085682 A1 8/2007
WO 2007/102144 A1 9/2007
WO 2008148927 A1 12/2008
WO 2009/101238 A1 8/2009
WO 2010015807 A1 2/2010
WO 2014203440 A1 12/2010
WO 2012030787 A2 3/2012
WO 2013/049012 A1 4/2013
WO 2013062701 A1 5/2013
WO 2014033306 A1 3/2014
WO 2015/143641 A1 10/2015
WO 2015143641 A1 10/2015
WO 2016/054092 A1 4/2016
WO 2017004695 A1 1/2017
WO 2017044761 A1 3/2017
WO 2017049163 A1 3/2017
WO 2017051595 A1 3/2017
WO 2017120475 A1 7/2017
WO 2017176861 A1 10/2017
WO 2017/203201 A1 11/2017
WO 2017203201 A1 11/2017
WO 2018008232 A1 1/2018
WO 2018/031261 A1 2/2018
WO 2018022523 A1 2/2018
WO 2018/044537 A1 3/2018
WO 2018039273 A1 3/2018
WO 2018057564 A1 3/2018
WO 2018085287 A1 5/2018
WO 2018087408 A1 5/2018
WO 2018097831 A1 5/2018
WO 2018166921 A1 9/2018
WO 2018236587 A1 12/2018

(56) References Cited

FOREIGN PATENT DOCUMENTS

WO 2019040493 A1 2/2019
WO 2019148154 A1 8/2019
WO 2020010226 A1 1/2020

OTHER PUBLICATIONS

"Communication Pursuant to Article 94(3) EPC dated May 30, 2022", European Patent Application No. 19768418.6, (6 pages).
"Extended European Search Report dated Aug. 24, 2022", European Patent Application No. 20846338.0, (13 pages).
"Extended European Search Report dated Aug. 8, 2022", European Patent Application No. 19898874.3, (8 pages).
"Extended European Search Report dated Sep. 8, 2022", European Patent Application No. 20798769.4, (13 pages).
"Extended European Search Report dated Mar. 22, 2022", European Patent Application No. 19843487.0, (14 pages).
"Extended European Search Report dated May 16, 2022", European Patent Application No. 19871001.4, (9 pages).
"Extended European Search Report dated May 30, 2022", European Patent Application No. 20753144.3, (10 pages).
"Final Office Action dated Jul. 13, 2022", U.S. Appl. No. 17/262,991, (18 pages).
"First Examination Report dated Jul. 27, 2022", Chinese Patent Application No. 201980036675.2, (5 pages).
"First Examination Report dated Jul. 28, 2022", Indian Patent Application No. 202047024232, (6 pages).
"First Examination Report dated May 13, 2022", Indian Patent Application No. 202047026359, (8 pages).
"FS_XR5G: Permanent document, v0.4.0", Qualcomm Incorporated, 3GPP TSG-SA 4 Meeting 103 retrieved from the Internet: URL:http://www.3gpp.org/ftp/Meetings%5F3GP P%5FSYNC/SA4/Docs/S4%2DI90526%2Ezip [retrieved on Apr. 12, 2019], Apr. 12, 2019, (98 pages).
"Non Final Office Action dated Jul. 26, 2022", U.S. Appl. No. 17/098,059, (28 pages).
"Non Final Office Action dated May 10, 2022", U.S. Appl. No. 17/140,921, (25 pages).
"Non Final Office Action dated May 17, 2022", U.S. Appl. No. 16/748,193, (11 pages).
"Non Final Office Action dated Sep. 19, 2022", U.S. Appl. No. 17/263,001, (14 pages).
"Second Office Action dated Jul. 13, 2022 with English Translation", Chinese Patent Application No. 201880079474.6, (10 pages).
"Second Office Action dated Jun. 20, 2022 with English Translation", Chinese Patent Application No. 201880089255.6, (14 pages).
Anonymous , "Koi Pond: Top iPhone App Store Paid App", https://web.archive.org/web/20080904061233/https://www.iphoneincanada.ca/reviews /koi-pond-top-iphone-app-store-paid-app/—[retrieved on Aug. 9, 2022], (2 pages).
Chittineni, C. , et al., "Single filters for combined image geometric manipulation and enhancement", Proceedings of SPIE vol. 1903, Image and Video Processing, Apr. 8, 1993, San Jose, CA. (Year: 1993), pp. 111-121.
"Extended European Search Report dated Dec. 14, 2022", European Patent Application No. 20886547.7, (8 pages).
"Extended European Search Report dated Nov. 3, 2022", European Patent Application No. 20770244.0, (23 pages).
"Final Office Action dated Dec. 29, 2022", U.S. Appl. No. 17/098,059, (32 pages).
"First Office Action dated Dec. 22, 2022 with English translation", Chinese Patent Application No. 201980061450.2, (11 pages).
"First Office Action dated Jan. 24, 2023 with English translation", Japanese Patent Application No. 2020-549034, (7 pages).
"First Office Action dated Sep. 16, 2022 with English translation", Chinese Patent Application No. 201980063642.7, (7 pages).
"Non Final Office Action dated Dec. 7, 2022", U.S. Appl. No. 17/357,795, (63 pages).
"Non Final Office Action dated Feb. 3, 2023", U.S. Appl. No. 17/429,100, (16 pages).
"Non Final Office Action dated Feb. 3, 2023", U.S. Appl. No. 17/497,965, (32 pages).
"Non Final Office Action dated Jan. 24, 2023", U.S. Appl. No. 17/497,940, (10 pages).
"Notice of Reason for Rejection dated Oct. 28, 2022 with English translation", Japanese Patent Application No. 2020-531452, (3 pages).
"Office Action dated Nov. 24, 2022 with English Translation", Japanese Patent Application No. 2020-533730, (11 pages).
"ARToolKit: Hardware", https://web.archive.org/web/20051013062315/http://www.hitl.washington.edu:80/artoolkit/documentation/hardware.htm (downloaded Oct. 26, 2020), Oct. 13, 2015, (3 pages).
Communication according to Rule 164(1) EPC dated Feb. 23, 2022, European Patent Application No. 20753144.3, (11 pages).
Communication Pursuant to Article 94(3) EPC dated Sep. 4, 2019, European Patent Application No. 10793707.0, (4 pages).
Communication Pursuant to Article 94(3) EPC dated Jan. 4, 2022, European Patent Application No. 20154070.5, (8 pages).
Communication Pursuant to Article 94(3) EPC dated Oct. 21, 2021, European Patent Application No. 16207441.3, (4 pages).
Communication Pursuant to Rule 164(1) EPC dated Jul. 27, 2021, European Patent Application No. 19833664.6, (11 pages).
European Search Report dated Oct. 15, 2020, European Patent Application No. 20180623.9, (10 pages).
Examination Report dated Jun. 19, 2020, European Patent Application No. 20154750.2, (10 pages).
Extended European Search Report dated May 20, 2020, European Patent Application No. 20154070.5, (7 pages).
Extended European Search Report dated Jan. 22, 2021, European Patent Application No. 18890390.0, (11 pages).
Extended European Search Report dated Nov. 3, 2020, European Patent Application No. 18885707.2, (7 pages).
Extended European Search Report dated Jun. 30, 2021, European Patent Application No. 19811971.1, (9 pages).
Extended European Search Report dated Mar. 4, 2021, European Patent Application No. 19768418.6, (9 pages).
Extended European Search Report dated Nov. 4, 2020, European Patent Application No. 20190980.1, (14 pages).
Extended European Search Report dated Jun. 12, 2017, European Patent Application No. 16207441.3, (8 pages).
Extended European Search Report dated Jan. 28, 2022, European Patent Application No. 19815876.8, (9 pages).
Extended European Search Report dated Jan. 4, 2022, European Patent Application No. 19815085.6, (9 pages).
Extended European Search Report dated Jul. 16, 2021, European Patent Application No. 19810142.0, (14 pages).
Extended European Search Report dated Jul. 30, 2021, European Patent Application No. 19839970.1, (7 pages).
Extended European Search Report dated Jun. 19, 2020, European Patent Application No. 20154750.2, (10 pages).
Extended European Search Report dated Oct. 27, 2021, European Patent Application No. 19833664.6, (10 pages).
Extended European Search Report dated Sep. 20, 2021, European Patent Application No. 19851373.1, (8 pages).
Extended European Search Report dated Sep. 28, 2021, European Patent Application No. 19845418.3, (13 pages).
Final Office Action dated Aug. 10, 2020, U.S. Appl. No. 16/225,961, (13 pages).
Final Office Action dated Dec. 4, 2019, U.S. Appl. No. 15/564,517, (15 pages).
Final Office Action dated Feb. 19, 2020, U.S. Appl. No. 15/552,897, (17 pages).
Final Office Action dated Feb. 23, 2022, U.S. Appl. No. 16/748,193, (23 pages).
Final Office Action dated Feb. 3, 2022, U.S. Appl. No. 16/864,721, (36 pages).
Final Office Action dated Jun. 15, 2021, U.S. Appl. No. 16/928,313, (42 pages).
Final Office Action dated Mar. 1, 2021, U.S. Appl. No. 16/214,575, (29 pages).

(56) References Cited

OTHER PUBLICATIONS

Final Office Action dated Mar. 19, 2021, U.S. Appl. No. 16/530,776, (25 pages).
Final Office Action dated Nov. 24, 2020, U.S. Appl. No. 16/435,933, (44 pages).
Final Office Action dated Sep. 17, 2021, U.S. Appl. No. 16/938,782, (44 pages).
First Office Action dated Mar. 14, 2022 with English translation, Chinese Patent Application No. 201880079474.6, (11 pages).
International Search Report and Written Opinion dated Feb. 12, 2021, International Application No. PCT/US20/60555, (25 pages).
International Search Report and Written Opinion dated Mar. 12, 2020, International PCT Patent Application No. PCT/US19/67919, (14 pages).
International Search Report and Written Opinion dated Aug. 15, 2019, International PCT Patent Application No. PCT/US19/33987, (20 pages).
International Search Report and Written Opinion dated Jun. 15, 2020, International PCT Patent Application No. PCT/US2020/017023, (13 pages).
International Search Report and Written Opinion dated Oct. 16, 2019, International PCT Patent Application No. PCT/US19/43097, (10 pages).
International Search Report and Written Opinion dated Oct. 16, 2019, International PCT Patent Application No. PCT/US19/36275, (10 pages).
International Search Report and Written Opinion dated Oct. 16, 2019, International PCT Patent Application No. PCT/US19/43099, (9 pages).
International Search Report and Written Opinion dated Jun. 17, 2016, International PCT Patent Application No. PCT/FI2016/050172, (9 pages).
International Search Report and Written Opinion dated Feb. 2, 2021, International PCT Patent Application No. PCT/US20/60550, (9 pages).
International Search Report and Written Opinion dated Oct. 22, 2019, International PCT Patent Application No. PCT/US19/43751, (9 pages).
International Search Report and Written Opinion dated Dec. 23, 2019, International PCT Patent Application No. PCT/US19/44953, (11 pages).
International Search Report and Written Opinion dated May 23, 2019, International PCT Patent Application No. PCT/US18/66514, (17 pages).
International Search Report and Written Opinion dated Sep. 26, 2019, International PCT Patent Application No. PCT/US19/40544, (12 pages).
International Search Report and Written Opinion dated Aug. 27, 2019, International PCT Application No. PCT/US2019/035245, (8 pages).
International Search Report and Written Opinion dated Dec. 27, 2019, International Application No. PCT/US19/47746, (16 pages).
International Search Report and Written Opinion dated Dec. 3, 2020, International Patent Application No. PCT/US20/43596, (25 pages).
International Search Report and Written Opinion dated Sep. 30, 2019, International Patent Application No. PCT/US19/40324, (7 pages).
International Search Report and Written Opinion dated Sep. 4, 2020, International Patent Application No. PCT/US20/31036, (13 pages).
International Search Report and Written Opinion dated Jun. 5, 2020, International Patent Application No. PCT/US20/19871, (9 pages).
International Search Report and Written Opinion dated Aug. 8, 2019, International PCT Patent Application No. PCT/US2019/034763, (8 pages).
International Search Report and Written Opinion dated Oct. 8, 2019, International PCT Patent Application No. PCT/US19/41151, (7 pages).
International Search Report and Written Opinion dated Jan. 9, 2020, International Application No. PCT/US19/55185, (10 pages).
International Search Report and Written Opinion dated Feb. 28, 2019, International Patent Application No. PCT/US18/64686, (8 pages).
International Search Report and Written Opinion dated Feb. 7, 2020, International PCT Patent Application No. PCT/US2019/061265, (11 pages).
International Search Report and Written Opinion dated Jun. 11, 2019, International PCT Application No. PCT/US19/22620, (7 pages).
Invitation to Pay Additional Fees dated Aug. 15, 2019, International PCT Patent Application No. PCT/US19/36275, (2 pages).
Invitation to Pay Additional Fees dated Sep. 24, 2020, International Patent Application No. PCT/US2020/043596, (3 pages).
Invitation to Pay Additional Fees dated Oct. 22, 2019, International PCT Patent Application No. PCT/US19/47746, (2 pages).
Invitation to Pay Additional Fees dated Apr. 3, 2020, International Patent Application No. PCT/US20/17023, (2 pages).
Invitation to Pay Additional Fees dated Oct. 17, 2019, International PCT Patent Application No. PCT/US19/44953, (2 pages).
"multi-core processor", TechTarget , 2013 , (1 page).
Non Final Office Action dated Nov. 19. 2019, U.S. Appl. No. 16/355,611, (31 pages).
Non Final Office Action dated Apr. 1, 2022, U.S. Appl. No. 17/256,961, (65 pages).
Non Final Office Action dated Apr. 11, 2022, U.S. Appl. No. 16/938,782, (52 pages).
Non Final Office Action dated Apr. 12, 2022, U.S. Appl. No. 17/262,991, (60 pages).
Non Final Office Action dated Aug. 21, 2019, U.S. Appl. No. 15/564,517, (14 pages).
Non Final Office Action dated Aug. 4, 2021, U.S. Appl. No. 16/864,721, (51 pages).
Non Final Office Action dated Feb. 2, 2022, U.S. Appl. No. 16/783,866, (8 pages).
Non Final Office Action dated Jan. 26, 2021, U.S. Appl. No. 16/928,313, (33 pages).
Non Final Office Action dated Jan. 27, 2021, U.S. Appl. No. 16/225,961, (15 pages).
Non Final Office Action dated Jul. 27, 2020, U.S. Appl. No. 16/435,933, (16 pages).
Non Final Office Action dated Jul. 9, 2021, U.S. Appl. No. 17/002,663, (43 pages).
Non Final Office Action dated Jul. 9, 2021, U.S. Appl. No. 16/833,093, (47 pages).
Non Final Office Action dated Jun. 10, 2021, U.S. Appl. No. 16/938,782, (40 Pages).
Non Final Office Action dated Jun. 17, 2020, U.S. Appl. No. 16/682, 911, (22 pages).
Non Final Office Action dated Jun. 19, 2020, U.S. Appl. No. 16/225,961, (35 pages).
Non Final Office Action dated Jun. 29, 2021, U.S. Appl. No. 16/698,588, (58 pages).
Non Final Office Action dated Mar. 3, 2021, U.S. Appl. No. 16/427,337, (41 pages).
Non Final Office Action dated Mar. 31, 2022, U.S. Appl. No. 17/257,814, (60 pages).
Non Final Office Action dated Mar. 9, 2022, U.S. Appl. No. 16/870,676, (57 pages).
Non Final Office Action dated May 26, 2021, U.S. Appl. No. 16/214,575, (19 pages).
Non Final Office Action dated Nov. 5, 2020, U.S. Appl. No. 16/530,776, (45 pages).
Non Final Office Action dated Oct. 22, 2019, U.S. Appl. No. 15/859,277, (15 pages).
Non Final Office Action dated Sep. 1, 2020, U.S. Appl. No. 16/214,575, (40 pages).
Non Final Office Action dated Sep. 20, 2021, U.S. Appl. No. 17/105,848, (56 pages).
Non Final Office Action dated Sep. 29, 2021, U.S. Appl. No. 16/748,193, (62 pages).
Notice of Allowance dated Mar. 25, 2020, U.S. Appl. No. 15/564,517, (11 pages).

(56) References Cited

OTHER PUBLICATIONS

Notice of Allowance dated Oct. 5, 2020, U.S. Appl. No. 16/682,911, (27 pages).

Notice of Reason of Refusal dated Sep. 11, 2020 with English translation, Japanese Patent Application No. 2019-140435, (6 pages).

"Phototourism Challenge", CVPR 2019 Image Matching Workshop. https://image matching- workshop. github.io., (16 pages).

Summons to attend oral proceedings pursuant to Rule 115(1) EPC mailed on Jul. 15, 2019, European Patent Application No. 15162521.7, (7 pages).

Aarik, J. , et al. , "Effect of crystal structure on optical properties of TiO2 films grown by atomic layer deposition", Thin Solid Films; Publication [online). May 19, 1998 [retrieved Feb. 19, 2020]. Retrieved from the Internet: <URL: https://www.sciencedirect.com/science/article/pii/S0040609097001351?via%3Dihub>; DOI: 10.1016/S0040-6090(97)00135-1; see entire document, (2 pages).

Altwaijry , et al. , "Learning to Detect and Match Keypoints with Deep Architectures", Proceedings of the British Machine Vision Conference (BMVC), BMVA Press, Sep. 2016, [retrieved on Jan. 8, 2021 (Jan. 8, 2021 )] <URL: http://www.bmva.org/bmvc/2016/papers/paper049/index.html >, en lire document, especially Abstract.

Arandjelović, Relja , et al. , "Three things everyone should know to improve object retrieval" , CVPR, 2012, (8 pages).

Azom, "Silica—Silicon Dioxide (SiO2)" , AZO Materials; Publication [Online]. Dec. 13, 2001 [retrieved Feb. 19, 2020]. Retrieved from the Internet: <URL: https://www.azom.com/article.aspx?Article1D=1114>.

Azuma, Ronald T. , "A Survey of Augmented Reality" , Presence: Teleoperators and Virtual Environments 6, 4 (Aug. 1997), 355-385; https://web.archive.org/web/20010604100006/http://www.cs.unc.edu/~azuma/ARpresence.pdf (downloaded Oct. 26, 2020).

Azuma, Ronald T. , "Predictive Tracking for Augmented Reality", Department of Computer Science, Chapel Hill NC; TR95-007, Feb. 1995, 262 pages.

Battaglia, Peter W, et al. , "Relational inductive biases, deep learning, and graph networks", arXiv:1806.01261, Oct. 17, 2018, pp. 1-40.

Berg, Alexander C , et al. , "Shape matching and object recognition using low distortion correspondences" , In CVPR, 2005, (8 pages).

Bian, Jiawang , et al. , "GMS: Grid-based motion statistics for fast, ultra-robust feature correspondence." , In CVPR (Conference on Computer Vision and Pattern Recognition), 2017, (10 pages).

Bimber, Oliver , et al. , "Spatial Augmented Reality: Merging Real and Virtual Worlds", https://web.media.mit.edu/~raskar/book/BimberRaskarAugmentedRealityBook.pdf; published by A K Peters/CRC Press (Jul. 31, 2005); eBook (3rd Edition, 2007), (393 pages).

Brachmann, Eric , et al. , "Neural-Guided Ransac: Learning Where to Sample Model Hypotheses" , In ICCV (International Conference on Computer Vision ), arXiv:1905.04132v2 [cs.CV] Jul. 31, 2019, (17 pages).

Butail , et al. , "Putting the fish in the fish tank: Immersive VR for animal behavior experiments" , In: 2012 IEEE International Conference on Robotics and Automation. May 18, 2012 (May 18, 2012) Retrieved on 14 Nov. 2020 (Nov. 14, 2020) from <http:/lcdcl.umd.edu/papers/icra2012.pdf> entire document.

Caetano, TIBéRio S , et al. , "Learning graph matching", IEEE TPAMI, 31(6):1048-1058, 2009.

Cech, Jan , et al. , "Efficient sequential correspondence selection by cosegmentation", IEEE TPAMI, 32(9):1568-1581, Sep. 2010.

Cuturi, Marco, "Sinkhorn distances: Lightspeed computation of optimal transport", NIPS, 2013, (9 pages).

Dai, Angela , et al. , "ScanNet: Richly-annotated 3d reconstructions of indoor scenes", in CVPR, arXiv:1702.04405v2 [cs.Cv] Apr. 11, 2017, (22 pages).

Deng, Haowen , et al. , "PPFnet: Global context aware local features for robust 3d point matching", in CVPR, arXiv:1802.02669v2 [cs.CV] Mar. 1, 2018, (12 pages).

Detone, Daniel , et al. , "Deep image homography estimation", in RSS Work—shop: Limits and Potentials of Deep Learning in Robotics, arXiv:1606.03798v1 [cs.CV] Jun. 13, 2016, (6 pages).

Detone, Daniel , et al. , "Self-improving visual odometry", arXiv:1812.03245, Dec. 8, 2018, (9 pages).

Detone, Daniel , et al. , "SuperPoint: Self-supervised interest point detection and description", in CVPR Workshop on Deep Learning for Visual SLAM, arXiv:1712.07629v4 [cs.CV] Apr. 19, 2018, (13 pages).

Dusmanu, Mihai , et al. , "D2-net: a trainable CNN for joint detection and description of local features" , CVPR, arXiv:1905.03561v1 [cs.CV] May 9, 2019, (16 pages).

Ebel, Patrick , et al. , "Beyond cartesian representations for local descriptors", ICCV, arXiv:1908.05547v1 [cs.CV] Aug. 15, 2019, (11 pages).

Fischler, Martin A , et al. , "Random sample consensus: a paradigm for model fitting with applications to image analysis and automated cartography", Communications of the ACM, 24(6): 1981, pp. 381-395.

Gilmer, Justin , et al. , "Neural message passing for quantum chemistry", in ICML, arXiv:1704.01212v2 [cs.LG] Jun. 12, 2017, (14 pages).

Giuseppe, Donato , et al. , "Stereoscopic helmet mounted system for real time 3D environment reconstruction and indoor ego—motion estimation", Proc. SPIE 6955, Head—and Helmet-Mounted Displays XIII: Design and Applications, SPIE Defense and Security Symposium, 2008, Orlando, Florida, United States, 69550P.

Goodfellow, "Titanium Dioxide—Titania (TiO2)", AZO Materials; Publication [online]. Jan. 11, 2002 [retrieved Feb. 19, 2020]. Retrieved from the Internet: <URL: https://www.azom.com/article.aspx?Article1D=1179>.

Hartley, Richard , et al. , "Multiple View Geometry in Computer Vision", Cambridge University Press, 2003, pp. 1-673.

Jacob, Robert J.K. , "Eye Tracking in Advanced Interface Design", Human-Computer Interaction Lab, Naval Research Laboratory, Washington, D.C., date unknown. 2003, pp. 1-50.

Lee , et al. , "Self-Attention Graph Pooling", Cornell University Library/Computer Science/Machine Learning, Apr. 17, 2019 [retrieved on Jan. 8, 2021 from the Internet< URL: https://arxiv.org/abs/1904.08082 >, entire document.

Lee, Juho , et al. , "Set transformer: A frame—work for attention-based permutation-invariant neural networks", ICML, arXiv:1810.00825v3 [cs.LG] May 26, 2019, (17 pages).

Leordeanu, Marius , et al. , "A spectral technique for correspondence problems using pairwise constraints", Proceedings of (ICCV) International Conference on Computer Vision, vol. 2, pp. 1482-1489, Oct. 2005, (8 pages).

Levola, T., "Diffractive Optics for Virtual Reality Displays", Journal of the SID Eurodisplay 14/05, 2005, XP008093627, chapters 2-3, Figures 2 and 10, pp. 467-475.

Levola, Tapani, "Invited Paper: Novel Diffractive Optical Components for Near to Eye Displays—Nokia Research Center" , SID 2006 DIGEST, 2006 SID International Symposium, Society for Information Display, vol. XXXVII, May 24, 2005, chapters 1-3, figures 1 and 3, pp. 64-67.

Li, Yujia, et al. , "Graph matching networks for learning the similarity of graph structured objects", ICML, arXiv:1904.12787v2 [cs.LG] May 12, 2019, (18 pages).

Li, Zhengqi , et al. , "Megadepth: Learning single—view depth prediction from internet photos", in CVPR, fromarXiv: 1804.00607v4 [cs.CV] Nov. 28, 2018, (10 pages).

Libovicky , et al. , "Input Combination Strategies for Multi-Source Transformer Decoder", Proceedings of the Third Conference on Machine Translation (WMT). vol. 1: Research Papers, Belgium, Brussels, Oct. 31-Nov. 1, 2018; retrieved on Jan. 8, 2021 (Jan. 8, 2021 ) from < URL: https://doi.org/10.18653/v1/W18-64026 >, entire document.

Loiola, Eliane Maria, et al. , "A survey for the quadratic assignment problem", European journal of operational research, 176(2): 2007, pp. 657-690.

Lowe, David G , "Distinctive image features from scale—invariant keypoints", International Journal of Computer Vision, 60(2): 91-110, 2004, (28 pages).

Luo, Zixin , et al. , "ContextDesc: Local descriptor augmentation with cross-modality context", CVPR, arXiv:1904.04084v1 [cs.CV] Apr. 8, 2019, (14 pages).

(56) References Cited

OTHER PUBLICATIONS

Memon, F. , et al. , "Synthesis, Characterization and Optical Constants of Silicon Oxycarbide", EPJ Web of Conferences; Publication [online). Mar. 23, 2017 [retrieved Feb. 19, 2020) .<URL: https://www.epj-conferences.org/articles/epjconf/pdf/2017/08/epjconf_nanop2017 _00002.pdf>; DOI: 10.1051/epjconf/201713900002, (8 pages).
Molchanov, Pavlo , et al. , "Short-range FMCW monopulse radar for hand-gesture sensing", 2015 IEEE Radar Conference (RadarCon) (2015), pp. 1491-1496.
Mrad , et al. , "A framework for System Level Low Power Design Space Exploration", 1991.
Munkres, James, "Algorithms for the assignment and transportation problems", Journal of the Society for Industrial and Applied Mathematics, 5(1): 1957, pp. 32-38.
Ono, Yuki , et al. , "LF-Net: Learning local features from images", 32nd Conference on Neural Information Processing Systems (NIPS 2018), arXiv:1805.09662v2 [cs.CV] Nov. 22, 2018, (13 pages).
Paszke, Adam , et al. , "Automatic differentiation in Pytorch", 31st Conference on Neural Information Processing Systems (NIPS 2017), Long Beach, CA, USA, (4 pages).
Peyré, Gabriel , et al. , "Computational Optimal Transport", Foundations and Trends in Machine Learning, 11(5-6):355-607, 2019; arXiv:1803.00567v4 [stat.ML] Mar. 18, 2020, (209 pages).
Qi, Charles Ruizhongtai, et al. , "Pointnet++: Deep hierarchical feature learning on point sets in a metric space.", 31st Conference on Neural Information Processing Systems (NIPS 2017), Long Beach, CA, USA., Jun. 7, 2017, (10 pages).
Qi, Charles R , et al. , "Pointnet: Deep Learning on Point Sets for 3D Classification and Segmentation", CVPR, arXiv:1612.00593v2 [cs.CV] Apr. 10, 2017, (19 pages).
Radenović, Filip , et al. , "Revisiting Oxford and Paris: Large-Scale Image Retrieval Benchmarking", CVPR, arXiv:1803.11285v1 [cs.CV] Mar. 29, 2018, (10 pages).
Raguram, Rahul , et al. , "A comparative analysis of ransac techniques leading to adaptive real-time random sample consensus", Computer Vision—ECCV 2008, 10th European Conference on Computer Vision, Marseille, France, Oct. 12-18, 2008, Proceedings, Part I, (15 pages).
Ranftl, René, et al. , "Deep fundamental matrix estimation", European Conference on Computer Vision (ECCV), 2018, (17 pages).
Revaud, Jerome , et al. , "R2D2: Repeatable and Reliable Detector and Descriptor" , in NeurIPS, arXiv: 1906.06195v2 [cs.CV] Jun. 17, 2019, (12 pages).
Rocco, Ignacio , et al. , "Neighbourhood Consensus Networks", 32nd Conference on Neural Information Processing Systems (NeurIPS 2018), Montreal, Canada, arXiv:1810.10510v2 [cs.CV] Nov. 29, 2018, (20 pages).
Rublee, Ethan , et al. , "ORB: An efficient alternative to SIFT or SURF", Proceedings of the IEEE International Conference on Computer Vision. 2564-2571. 2011; 10.1109/ICCV.2011.612654, (9 pages).
Sarlin , et al. , "SuperGlue: Learning Feature Matching with Graph Neural Networks", Cornell University Library/Computer Science/Computer Vision and Pattern Recognition, Nov. 26, 2019 [retrieved on Jan. 8, 2021 from the Internet< URL: https://arxiv.org/abs/1911.11763 >, entire document.
Sattler, Torsten , et al. , "SCRAMSAC: Improving RANSAC's efficiency with a spatial consistency filter", ICCV, 2009: 2090-2097., (8 pages).
Schonberger, Johannes Lutz, et al. , "Pixelwise view selection for un-structured multi-view stereo", Computer Vision—ECCV 2016: 14th European Conference, Amsterdam, The Netherlands, Oct. 11-14, 2016, Proceedings, Part III, pp. 501-518, 2016.
Schonberger, Johannes Lutz, et al. , "Structure-from-motion revisited", Proceedings of the IEEE Conference on Computer Vision and Pattern Recognition (CVPR), 2016, pp. 4104-4113, (11 pages).
Sheng, Liu , et al. , "Time-multiplexed dual-focal plane head-mounted display with a liquid lens", Optics Letters, Optical Society of Amer I Ca, US, vol. 34, No. 11, Jun. 1, 2009 (Jun. 1, 2009), XP001524475, ISSN: 0146-9592, pp. 1642-1644.
Sinkhorn, Richard , et al. , "Concerning nonnegative matrices and doubly stochastic matrices." , Pacific Journal of Mathematics, 1967, pp. 343-348.
Spencer, T. , et al. , "Decomposition of poly(propylene carbonate) with UV sensitive iodonium 11 salts" , Polymer Degradation and Stability; (online]. Dec. 24, 2010 (retrieved Feb. 19, 2020]., (17 pages).
Tanriverdi, Vildan , et al. , "Interacting With Eye Movements in Virtual Environments", Department of Electrical Engineering and Computer Science, Tufts University; Proceedings of the SIGCHI conference on Human Factors in Computing Systems, Apr. 2000, pp. 1-8.
Thomee, Bart , et al. , "YFCC100m: The new data in multimedia research", Communications of the ACM, 59(2):64-73, 2016; arXiv:1503.01817v2 [cs.MM] Apr. 25, 2016, (8 pages).
Torresani, Lorenzo , et al. , "Feature correspondence via graph matching: Models and global optimization", Computer Vision—ECCV 2008, 10th European Conference on Computer Vision, Marseille, France, Oct. 12-18, 2008, Proceedings, Part II, (15 pages).
Tuytelaars, Tinne , et al. , "Wide baseline stereo matching based on local, affinely invariant regions", BMVC, 2000, pp. 1-14.
Ulyanov, Dmitry , et al. , "Instance normalization: The missing ingredient for fast stylization", arXiv:1607.08022v3 [cs.CV] Nov. 6, 2017, (6 pages).
Vaswani, Ashish , et al. , "Attention is all you need", 31st Conference on Neural Information Processing Systems (NIPS 2017), Long Beach, CA, USA; arXiv:1706.03762v5 [cs.CL] Dec. 6, 2017, (15 pages).
Veličković, Petar , et al. , "Graph attention networks", ICLR, arXiv:1710.10903v3 [stat.ML] Feb. 4, 2018, (12 pages).
Villani, Cédric, "Optimal transport: old and new", vol. 338. Springer Science & Business Media, Jun. 2008, pp. 1-998.
Wang, Xiaolong , et al. , "Non-local neural networks", CVPR, arXiv:1711.07971v3 [cs.CV] Apr. 13, 2018, (10 pages).
Wang, Yue , et al. , "Deep Closest Point: Learning representations for point cloud registration", ICCV, arXiv:1905.03304v1 [cs.CV] May 8, 2019, (10 pages).
Wang, Yue , et al. , "Dynamic Graph CNN for learning on point clouds", ACM Transactions on Graphics, arXiv:1801.07829v2 [cs.CV] Jun. 11, 2019, (13 pages).
Weissel , et al. , "Process cruise control: event-driven clock scaling for dynamic power management", Proceedings of the 2002 international conference on Compilers, architecture, and synthesis for embedded systems. Oct. 11, 2002 (Oct. 11, 2002) Retrieved on May 16, 2020 (May 16, 2020) from <URL: https://dl.acm.org/doi/pdf/10.1145/581630.581668>.
Yi, Kwang Moo, et al. , "Learning to find good correspondences", CVPR, arXiv:1711.05971v2 [cs.CV] May 21, 2018, (13 pages).
Yi, Kwang Moo , et al. , "Lift: Learned invariant feature transform", ECCV, arXiv:1603.09114v2 [cs.CV] Jul. 29, 2016, (16 pages).
Zaheer, Manzil , et al. , "Deep Sets" , 31st Conference on Neural Information Processing Systems (NIPS 2017), Long Beach, CA, USA; arXiv:1703.06114v3 [cs.LG] Apr. 14, 2018, (29 pages).
Zhang, Jiahui , et al. , "Learning two-view correspondences and geometry using order-aware network", ICCV; aarXiv:1908.04964v1 [cs.CV] Aug. 14, 2019, (11 pages).
Zhang, Li , et al. , "Dual graph convolutional net-work for semantic segmentation", BMVC, 2019; arXiv:1909.06121v3 [cs.CV] Aug. 26, 2020, (18 pages).
"Decision of Rejection dated Jan. 5, 2023 with English translation", Chinese Patent Application No. 201880079474.6, (10 pages).
"Final Office Action dated Mar. 10, 2023", U.S. Appl. No. 17/357,795, (15 pages).
"First Office Action dated Jan. 30, 2023 with English translation", Chinese Patent Application No. 201980082951.9, (5 pages).
"Non Final Office Action dated Mar. 1, 2023", U.S. Appl. No. 18/046,739, (34 pages).
"Communication Pursuant to Article 94(3) EPC dated Feb. 28, 2023", European Patent Application No. 19845418.3, (6 Pages).

(56) References Cited

OTHER PUBLICATIONS

"Communication Pursuant to Article 94(3) EPC dated May 23, 2023", European Patent Application No. 18890390.0, (5 pages).
"Communication Pursuant to Rule 164(1) EPC dated Feb. 23, 2022", European Patent Application No. 20753144.3, (11 pages).
"Extended European Search Report dated Apr. 5, 2023", European Patent Application No. 20888716.6, (11 pages).
"First Examination Report dated Aug. 8, 2023", Australian Patent Application No. 2018379105, (3 pages).
"First Office Action dated Apr. 21, 2023 with English translation", Japanese Patent Application No. 2021-509779, (26 pages).
"First Office Action dated Jul. 4, 2023 with English translation", Japanese Patent Application No. 2021-505669, (6 pages).
"First Office Action dated Apr. 13, 2023 with English Translation", Japanese Patent Application No. 2020-567766, (7 pages).
"First Office Action dated Jun. 13, 2023 with English translation", Japanese Patent Application No. 2020-567853, (7 pages).
"First Office Action dated Mar. 27, 2023 with English translation", Japanese Patent Application No. 2020-566617, (6 pages).
"First Office Action dated Mar. 6, 2023 with English translation", Korean Patent Application No. 10-2020-7019685, (7 pages).
"First Office Action dated May 26, 2023 with English translation", Japanese Patent Application No. 2021-500607, (6 pages).
"First Office Action dated May 30, 2023", Israeli Patent Application No. 275065, (4 pages).
"First Office Action dated May 30, 2023 with English translation", Japanese Patent Application No. 2021-519873, (8 pages).
"Non Final Office Action dated Apr. 13, 2023", U.S. Appl. No. 17/098,043, (7 pages).
"Non Final Office Action dated Aug. 2, 2023", U.S. Appl. No. 17/807,600, (25 pages).
"Non Final Office Action dated Jun. 14, 2023", U.S. Appl. No. 17/516,483, (10 pages).
"Non Final Office Action dated May 11, 2023", U.S. Appl. No. 17/822,279, (24 pages).
"Notice of Allowance dated Jul. 27, 2023 with English translation", Korean Patent Application No. 10-2020-7019685, (4 pages).
"Office Action dated Apr. 13, 2023 with English translation", Japanese Patent Application No. 2020-533730, (13 pages).
"Office Action dated Jul. 20, 2023 with English translation", Japanese Patent Application No. 2021-505884, (6 pages).
"Office Action dated Jun. 8, 2023 with English translation", Japanese Patent Application No. 2021-503762, (6 pages).
"Office Action dated Mar. 30, 2023 with English translation", Japanese Patent Application No. 2020-566620, (10 pages).
"Second Office Action dated May 2, 2023 with English Translation", Japanese Patent Application No. 2020-549034, (6 pages).
Li, Yujia , et al., "Graph Matching Networks for Learning the Similarity of Graph Structured Objects", arxiv.org, Cornell University Library, 201 Olin Library Cornell University Ithaca, NY 14853, XP081268608, Apr. 29, 2019.
Luo, Zixin , et al., "ContextDesc: Local Descriptor Augmentation With Cross-Modality Context", 2019 IEEE/CVF Conference on Computer Vision and Pattern Recognition (CVPR), IEEE, XP033686823, DOI: 10.1109/CVPR.2019.00263 [retrieved on Jan. 8, 2020], Jun. 15, 2019, pp. 2522-2531.
Zhang, Zen , et al., "Deep Graphical Feature Learning for the Feature Matching Problem", 2019 IEEE/CVF International Conference on Computer Vision (ICCV), IEEE, XP033723985, DOI: 10.1109/ICCV.2019.00519 [retrieved on Feb. 24, 2020], Oct. 27, 2019, pp. 5086-5095.
"Communication Pursuant to Article 94(3) EPC dated Jul. 28, 2023", European Patent Application No. 19843487.0, (15 pages).
"Final Office Action dated Oct. 16, 2023", U.S. Appl. No. 17/098,043, (7 pages).
"Final Office Action dated Sep. 8, 2023 with English translation", Japanese Patent Application No. 2020-566620, (18 pages).
"Non Final Office Action dated Oct. 11, 2023", (14 pages).
"Wikipedia Dioptre", Jun. 22, 2018 (Jun. 22, 2018), XP093066995, Retrieved from the Internet: URL:https://en.wikipedia.org/w/index.php? title=Dioptre&direction=next&oldid=846451540 [retrieved on Jul. 25, 2023], (3 pages).
"First Office Action dated Sep. 29, 2023 with English translation", Japanese Patent Application No. 2023-10887, (5 pages).
"Non Final Office Action dated Nov. 3, 2023", U.S. Appl. No. 17/416,248, (17 pages).
"Non Final Office Action dated Oct. 24, 2023", U.S. Appl. No. 17/259,020, (21 pages).
"Penultimate Office Action dated Oct. 19, 2023 with English translation", Japanese Patent Application No. 2021-509779, (5 pages).
"Second Office Action dated Sep. 25, 2023 with English translation", Japanese Patent Application No. 2020-567853, (8 pages).
"Extended European Search Report dated Jan. 8, 2024", European Patent Application No. 23195266.4, (8 pages).
"Final Office Action dated Dec. 1, 2023", U.S. Appl. No. 17/357,795, (18 pages).
"First Office Action dated Dec. 12, 2023 with English translation", Japanese Patent Application No. 2021-545712, (8 pages).
"First Office Action dated Dec. 11, 2023", Chinese Patent Application No. 201980032005.3, (10 pages).
"Non Final Office Action dated Nov. 22, 2023", U.S. Appl. No. 17/268,376, (8 pages).
"Office Action dated Nov. 21, 2023 with English Translation", Japanese Patent Application No. 2021-535716, (15 pages).
"Office Action dated Dec. 14, 2023 with English translation", Japanese Patent Application No. 2021-526564, (13 pages).
"Office Action dated Nov. 7, 2023 with English translation", Korean Patent Application No. 10-2023-7036734, (5 pages).
"Office Action dated Nov. 8, 2023 with English translation", Chinese Patent Application No. 201980060018.1, (12 pages).

* cited by examiner

ANTI-REFLECTIVE COATINGS ON OPTICAL WAVEGUIDES

CROSS-REFERENCE TO RELATED APPLICATIONS

This application is a continuation of U.S. patent application Ser. No. 16/214,575, filed on Dec. 10, 2018, which claims priority from U.S. Provisional Patent Application No. 62/596,904, filed on Dec. 10, 2017 and, U.S. Provisional Patent Application No. 62/751,240, filed on Oct. 26, 2018, each of which is incorporated herein by reference in their entirety

BACKGROUND OF THE INVENTION

Surface treatments of substrates such as windows or photovoltaic devices (e.g. solar energy panels) benefit from a coating of layered anti-reflective material. Reduction of glare from light impacting glass, improved retention of natural light for energy costs, or increased absorption of light impacting a photovoltaic cell are some of the ways anti-reflective coatings are used. Conventional anti-reflective coatings provide benefits for substantially orthogonal light paths, relative to normal of a surface of a substrate, but are generally directed to maximize anti-reflection for such freespace light that anticipates origination of light completely external to a substrate. Conventional coatings also seek to increase transmission rates. Certain optical mediums manipulate light paths other than freespace origination, and antireflection coatings to optimize the performance of such mediums are needed.

SUMMARY

Embodiments of the present invention are generally directed to specific materials and thicknesses of layers for anti-reflective coatings in optical waveguides. More specifically, the embodiments and techniques described herein relate to anti-reflective coatings that must facilitate light propagation for total internal reflection (TIR), and simultaneously minimize light reflection at orthogonal angles or other freespace light. Embodiments described herein are directed away from seeking complete transmission of light.

Some embodiments are directed to a waveguide substrate having a first index of refraction, such as glass. The substrate may be planar, or cylindrical (such as a fiber optic). For planar substrates, a plurality of diffractive optical elements, such as a grating, is disposed upon a first surface, and an anti-reflective coating is disposed upon the opposite surface. For cylindrical waveguides, an anti-reflective coating is applied to the outer surface.

In some embodiments, the waveguide is configured to receive light, and propagate it along an axis by total internal reflection. In planar waveguides, the light travels in along such an axis in a first direction, and outcouples light in a substantially orthogonal direction when the light reflects off of a diffractive optical element of that corresponding surface. In cylindrical waveguides, the light reflects along the waveguide along an axis substantially parallel to the length of the waveguides, and outcouples at a distal end.

The anti-reflective coating of such embodiments is configured to minimize the phase retardation as between the s and p polarization states of the received light, such that the angle of bounce by TIR for each polarization component of light is substantially similar.

In some embodiments, the anti-reflective coating is a single layer of magnesium fluoride ($MgF_2$) having a thickness between 75 and 125 nanometers (nm). In some embodiments, a layer of silica ($SiO_2$) is applied as an outer layer to the coating.

In some embodiments, the anti-reflective coating has an imaginary refractive index value (alternatively referred to herein as an absorption coefficient), k, less than $5\times10^{-4}$. In some embodiments the k value of the complete coating is between $5\times10^{-4}$ and $1\times10^{-3}$, regardless of the number of layers comprising the coating. In some embodiments, the coating is a single layer of material. In some embodiments, the coating alternates between two materials, with one material having a comparatively higher index of refraction than the second material. In some embodiments, less than eight total layers are utilized.

In some embodiments, titania ($TiO_2$) with an index of refraction greater than 2 is utilized as a coating layer material; in some embodiments, $SiO_2$ with an index of refraction between 1.45 and 1.58 alternates layers with titania.

These materials and layer selections optimize the efficiency of light output by an optical waveguide, minimize phase retardation to reduce optical defects such as striations in images output by such a waveguide, and minimize the labor and material cost of conventional layers.

DETAILED DESCRIPTION

Antireflection coatings are generally configured to create out-of-phase reflections across layers of material with differing indices of refraction. Conventionally, single-layer anti-reflective coatings seek a refractive index, n, equal to the square root of the coated substrate's index of refraction, and with a thickness, t, equal to one quarter the wavelength, λ, of the light targeted by the anti-reflective coating.

$$n_{coating}=\sqrt{(n_{substrate})} \quad \text{Eq. 1}$$

$$t=\lambda_{target\ light}/(4 \cdot n_{coating}) \quad \text{Eq. 2}$$

Figure 1:
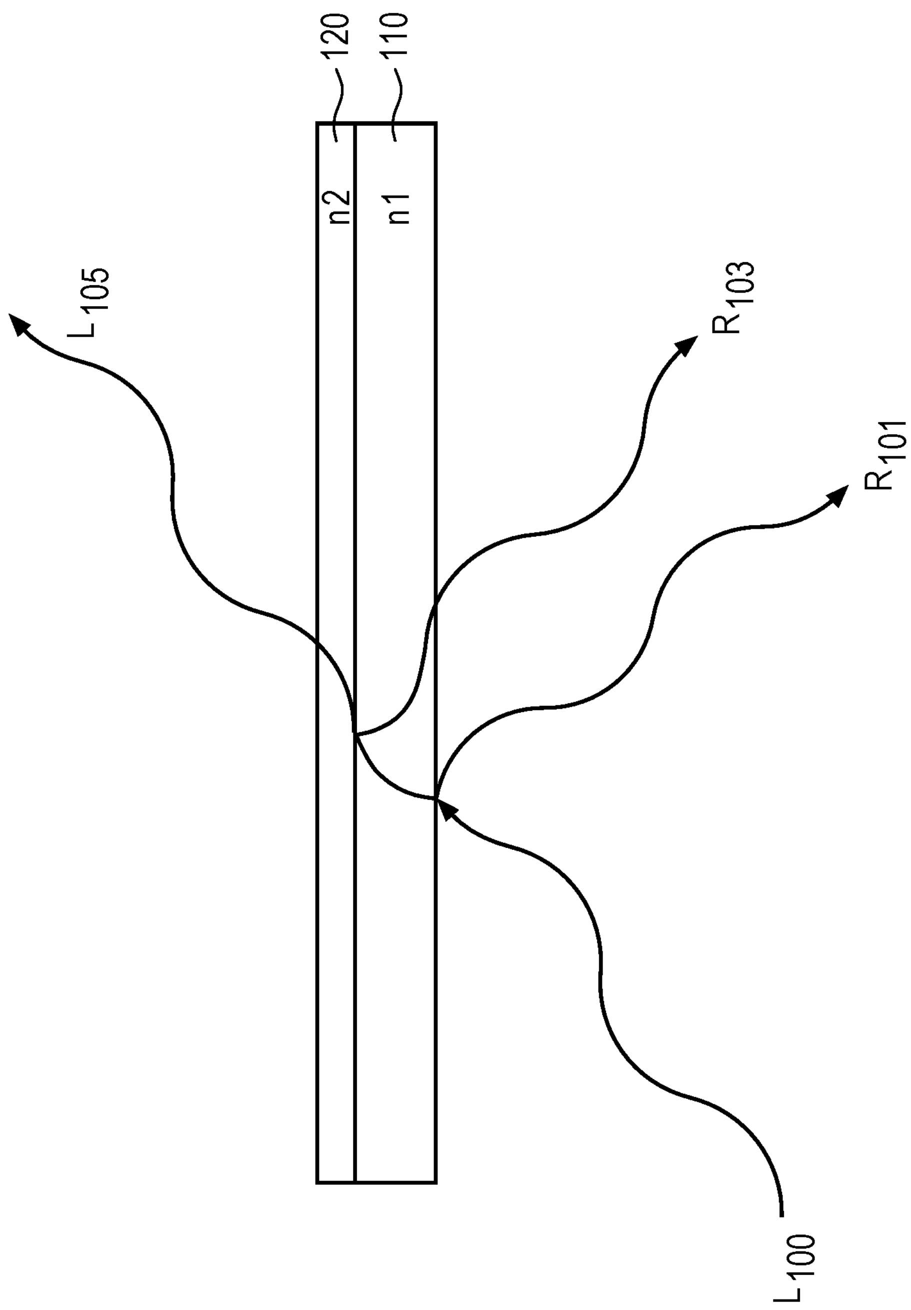
FIG. 1 is a top-down view showing an anti-reflective coating as understood with respect to its function to minimize reflected light and maximize absorption of light into a waveguide.

FIG. 1 depicts anti-reflection, with light L 100 impacting medium 110 and reflecting light R 101 while simultaneously transmitting to medium 120 and reflecting light R 103 that creates constructive interference with light R 101; remaining light L 105 transmits into medium 103. Many variations to improve the total amount of transmitted light L 105 are known. For example, broad band anti-reflection to improve transmission of multiple wavelengths with a single coating is achieved with additional and/or varying thickness layers.

Though the coating arrangement show in FIG. 1 may work as intended for freespace light, some optical systems employ waveguide technology; augmented or mixed reality system in particular maximize this technology in exit pupil expander systems to deliver light from a source and propagate that light through waveguides by TIR and then outcouple towards a user's eye.

Figure 2:
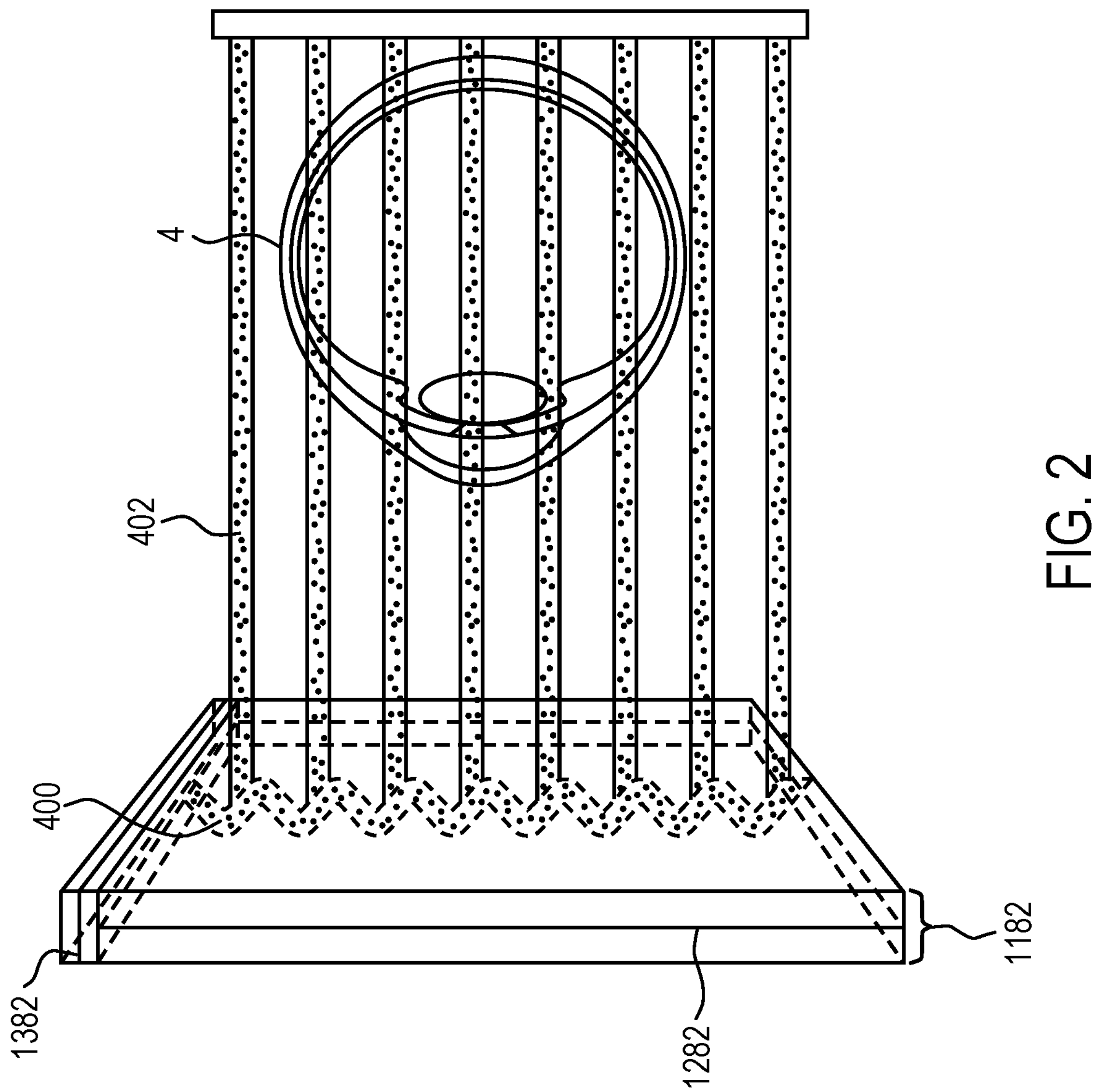
FIG. 2 is a top-down view showing a planar waveguide outcoupling a plurality of beams that propagate through the waveguide by total internal reflection according to some embodiments.

FIG. 2 shows a simplified version of such a system. One waveguide is illustrated, but it will be appreciated that other waveguides stacked together (as further described below with reference to FIG. 3) may function similarly. Light 400 is injected into the waveguide 1182 at an input surface 1382 of the waveguide 1182 and propagates within the waveguide 1182 by TIR. The input surface 1382 may be an incoupling grating formed by diffractive optical elements to diffract light 400 into the waveguide 1382 at angles supporting TIR. At points where the light 400 impinges upon outcoupling diffractive optical elements 1282, sampled portions exit the waveguide as a plurality of exit beams 402.

Each exit beam is a sampled beamlet of light 400 and increases the likelihood that any one sampled beamlet will be viewed by an eye 4 of a viewer. It is critical therefore that the waveguide 1182 maintains TIR to create the plurality of exit beams across its span, otherwise the exit beams 402 would not be distributed, and the resulting exit pupil(s) would only be viewable in certain positions of eye 4, limiting the applicability and flexibility of the system.

Figure 3:
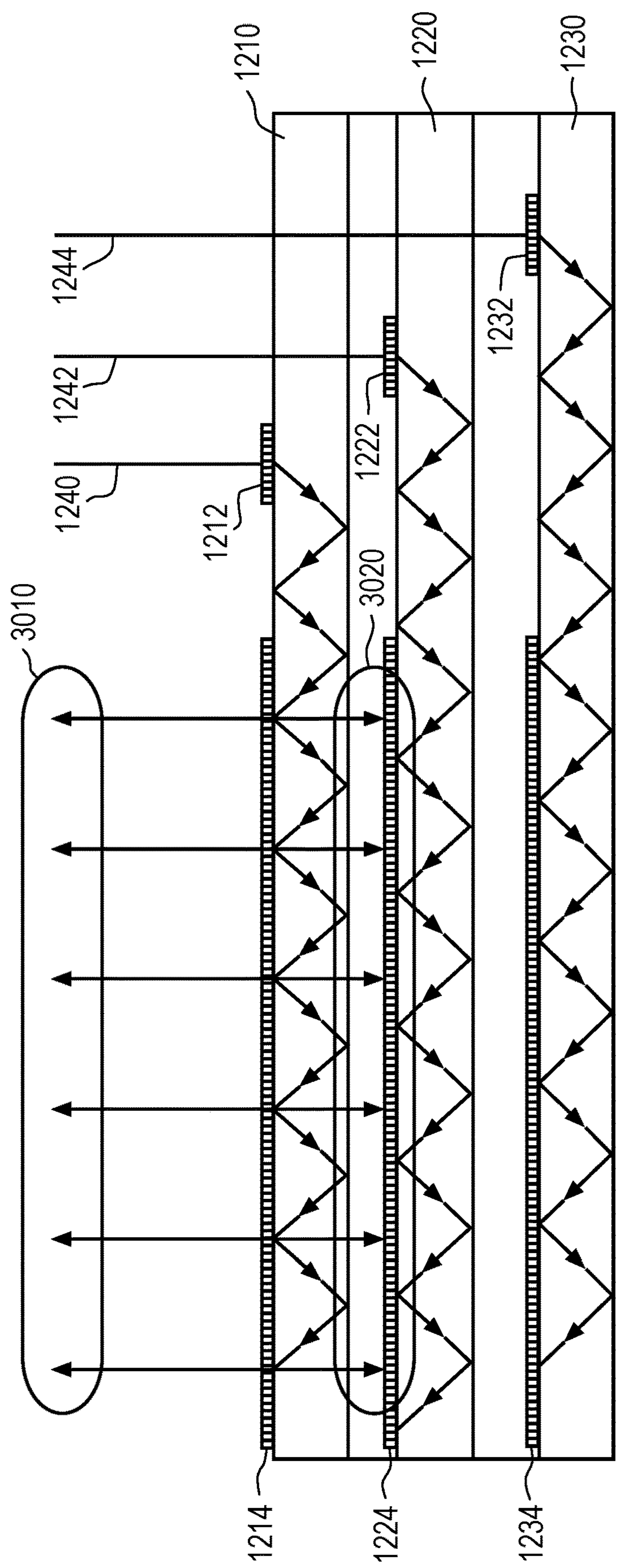
FIG. 3 is a top-down view showing a multi-waveguide stack outcoupling a plurality of beams as light bundles according to some embodiments.

FIG. 2 depicts a single waveguide system, but one of skill in the art will appreciate that if single waveguide 1182 imparts sampled portions of light 400, additional waveguides performing similar functions may impart additional sampled portions to create rich light effects such as multicolor component images or depth perception. FIG. 3 illustrates such a multi-layered system with three waveguides 1210, 1220, and 1230 propagating light by TIR. As each light path 1240, 1242 and 1244 respectively incouples at locations 1212, 1222, and 1232 impact a respective outcoupling diffractive optical element 1214, 1224, or 1234 (outcoupled light from paths 1222 and 1232 not depicted) disposed upon waveguide 1210, 1220, and 1230, it diffracts a plurality of beamlets in two directions: one towards the viewer (as in eye 4 of FIG. 2) represented by light bundle 3010, and one in a direction away from the viewer represented by light bundle 3020.

The light bundle 3020 may cause undesirable effects if it reflects off of the subsequent waveguide 1220, such as interference with light bundle 3010, increased blurriness due to any change in angle that may result from the reflection, etc. Here, an anti-reflective coating applied to the opposite surface of a waveguide from its outcoupling diffractive optical element will be beneficial to reduce these effects. A conventional coating that attempts to increase transmission generally will, however, degrade the light paths 1240, 1242, and 1244 as they progress across waveguides 1210, 1220, and 1230 by TIR. This degradation introduces uniformity complications at outcoupling, and results in poor image quality.

Figure 4:
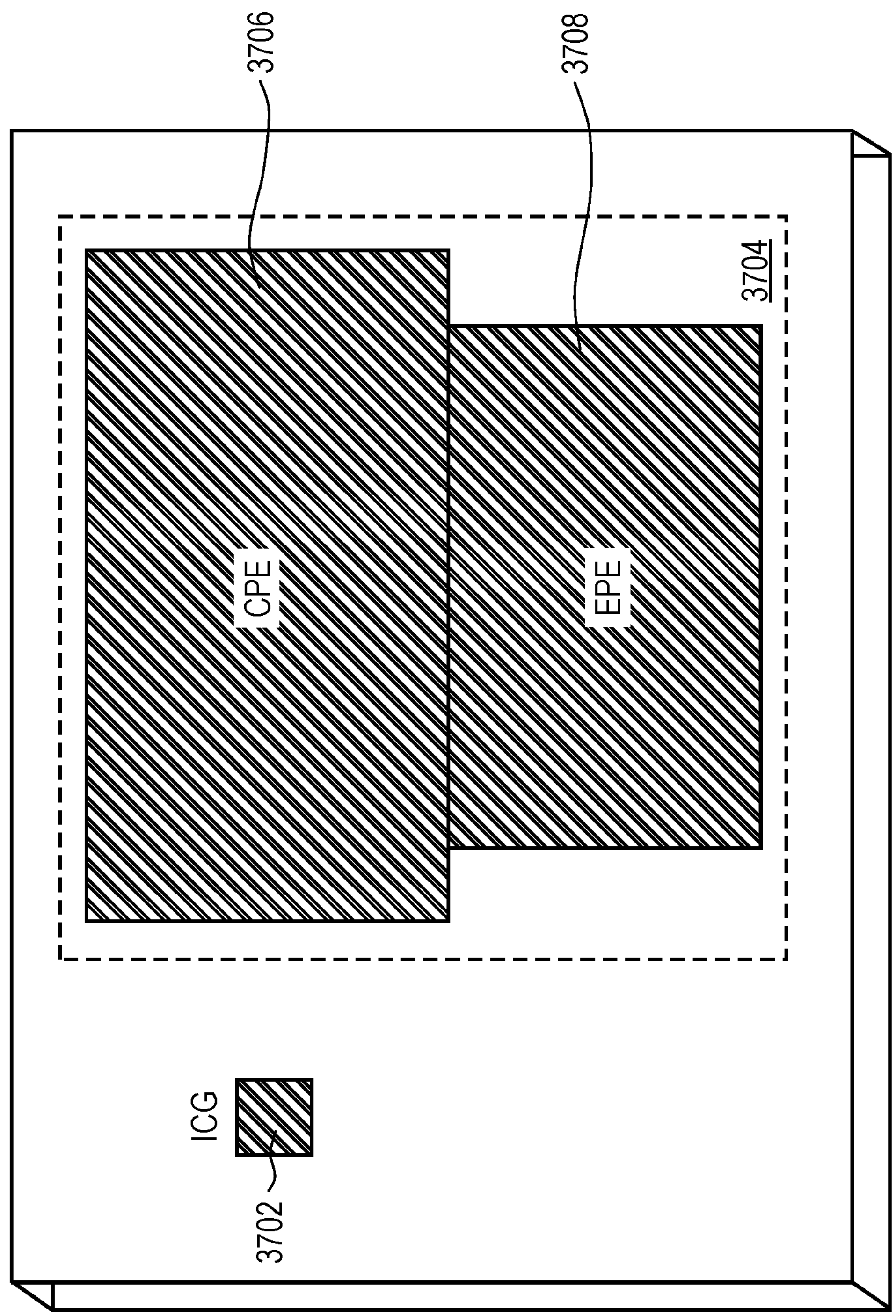
FIG. 4 is a front view of a planar waveguide having three diffractive optical element regions according to some embodiments.

Waveguide optical systems that employ pupil expander technology aggravate this problem. In a pupil expander system, such as depicted in FIG. 2, not only is light distributed in the substantially vertical direction, but also in an orthogonal direction to the exit beam path. FIG. 4 depicts an orthogonal pupil expander (OPE) 3706 disposed upon a waveguide 3704. FIG. 4 also depicts an exit pupil expander (EPE) 3708 for outcoupling progressive exit beams of TIR light, similar to outcoupling diffractive optical elements 1282 depicted in FIG. 2, and an incoupling grating (ICG) 3702 similar to the input surface 1382 of FIG. 2. In the waveguide system of FIG. 4, light incouples to the waveguide through the incoupling grating and diffracts towards the orthogonal pupil expander.

Figure 5:
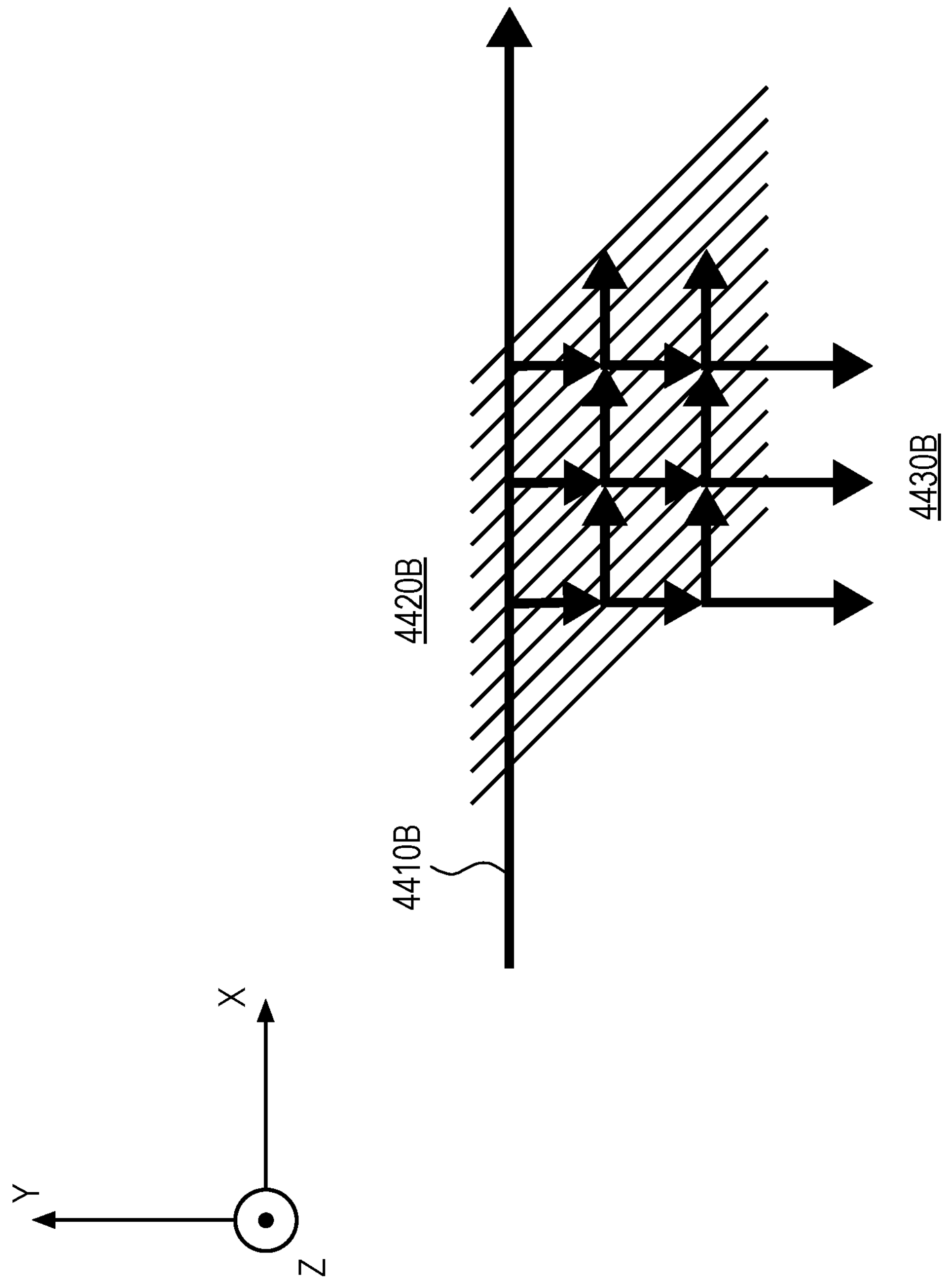
FIG. 5 is a front view showing an orthogonal pupil expander diffracting light across its span according to some embodiments.

FIG. 5 depicts light sampling across the orthogonal pupil expander. Light 4410B from the incoupling grating of FIG. 4 encounters a grating 4420B, such as a series of diffractive optical elements, that diffracts samples of light in a first direction and a sample 4430B of that same light in a second direction; the particular directions diffracted are a function of the particular geometries of the diffractive optical element.

Figure 6A:
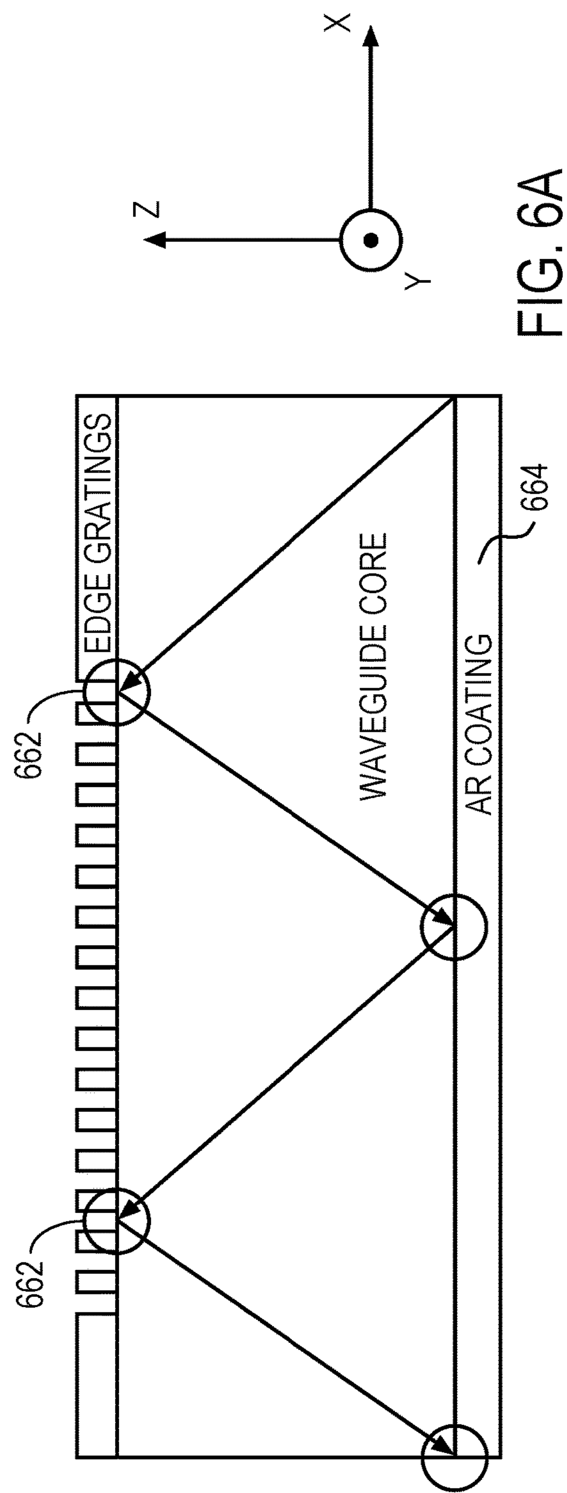
FIG. 6A is a top-down view showing a plurality of light bounces through a waveguide according to some embodiments.
Figure 6B:
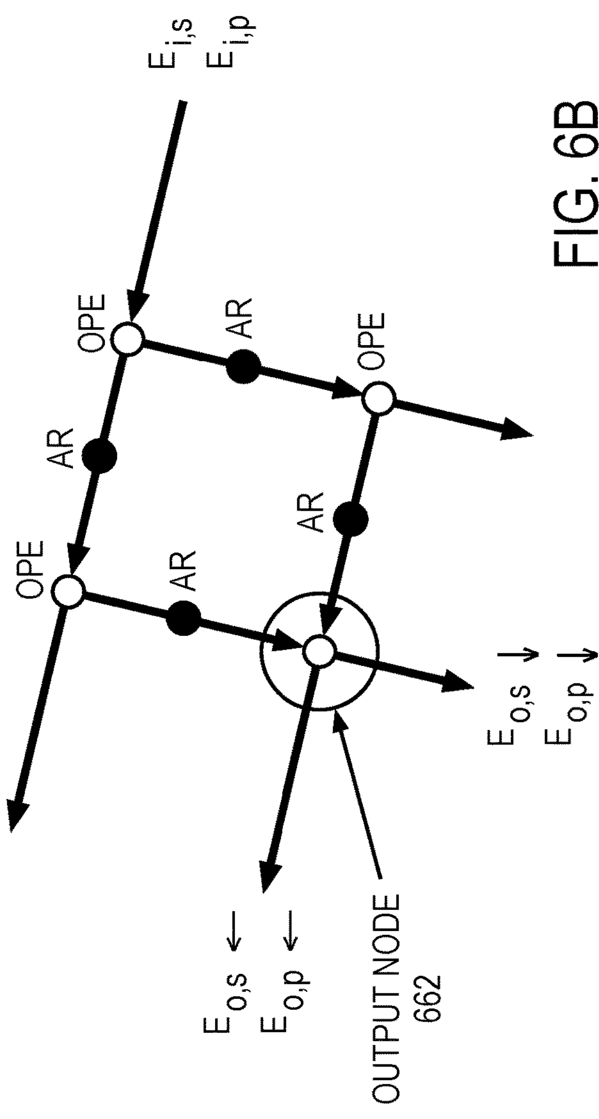
FIG. 6B is a front view of an inferometer network of energy transmitted through a waveguide configured to support total internal reflection according to some embodiments.

FIG. 6A depicts a cross-sectional view of this light path, one a waveguide comprising a grating 662 on one surface, and an anti-reflective coating 664 on the opposite surface. As light propagates by TIR through the waveguide, it alternatively reflects against the orthogonal pupil expander, and a surface opposite the orthogonal pupil expander. One of skill in the art will appreciate that a similar functionality occurs with the exit pupil expander region of the waveguide. To reduce the reflections described by light bundle 3020 in reference to FIG. 3, an anti-reflective coating is applied to this opposite surface. A cumulative light inferometer may be derived from this interaction, such as the unit cell inferometer depicted by FIG. 6B. In FIG. 6B, each interaction with the orthogonal pupil expander will sample the light into two paths, with a reflection against the anti-reflective coating side between each successive reflection against the orthogonal pupil expander. Each reflection off of the orthogonal pupil expander side or the anti-reflection side may further introduce polarization changes to the light, such that each successive bounce perturbs the polarization state and changes the energy at each output node.

By breaking down the polarization into the constituent s and p states, the resulting electric field, E, is a function of amplitude, A, and phase, j, of the light, and is depicted for each s and p path as follows:

$$E_{i,s}=A_{i,s}e^{j\phi_{i,s}} \quad \text{Eq. 3}$$

$$E_{i,p}=A_{i,p}e^{j\phi_{i,p}} \quad \text{Eq. 4}$$

where i indicates the variables' value at input.

Each interaction (indicated by a directionality arrow below with correlation to the paths of the light at an output node of FIG. 6B) may be described as a 2×2 matrix multiplied by the energy of the s and p elements of Eq. 3 and Eq. 4. Such that $$\begin{bmatrix} E_{o,s\downarrow} \\ E_{o,p\downarrow} \end{bmatrix} = \begin{bmatrix} \sqrt{\eta_{s\downarrow s\leftarrow}}\, e^{j\phi_{s\downarrow s\leftarrow}} & \sqrt{\eta_{s\downarrow p\leftarrow}}\, e^{j\phi_{s\downarrow p\leftarrow}} \\ \sqrt{\eta_{p\downarrow s\leftarrow}}\, e^{j\phi_{p\downarrow s\leftarrow}} & \sqrt{\eta_{p\downarrow p\leftarrow}}\, e^{j\phi_{p\downarrow p\leftarrow}} \end{bmatrix} \begin{bmatrix} E_{i,s\leftarrow} \\ E_{i,p\leftarrow} \end{bmatrix} = OPE_{\downarrow\leftarrow} \begin{bmatrix} E_{i,s\leftarrow} \\ E_{i,p\leftarrow} \end{bmatrix} \quad \text{Eq. 5}$$

where the left and downward are indicative of light diffracting to the left and down, as at output node 662 of FIG. 6B, and where $\eta$ is the diffraction efficiency of the transition and $\phi$ is the phase shift of the transition.

Additionally, each bounce off the AR coating can be described by a 2×2 matrix. In a planar coating, the off-diagonal elements of this matrix are 0, and the magnitude of the diagonal elements must be 1 due to the fact that, in a planar coating, the layers are parallel. Because there is no diffraction from the AR coating, there are only two of these matrices: $AR_{\downarrow\downarrow}$ and $AR_{\leftarrow\leftarrow}$.

$$AR_{\downarrow\downarrow} = \begin{bmatrix} e^{j\theta_{s\downarrow s\downarrow}} & 0 \\ 0 & e^{j\theta_{p\downarrow p\downarrow}} \end{bmatrix} \quad \text{Eq. 6}$$

$$AR_{\leftarrow\leftarrow} = \begin{bmatrix} e^{j\theta_{s\leftarrow s\leftarrow}} & 0 \\ 0 & e^{j\theta_{p\leftarrow p\leftarrow}} \end{bmatrix} \quad \text{Eq. 7}$$

The electric field state leaving the output node propagating downward (towards an exit pupil expander) can now be related to the electric field input state.

$$\begin{bmatrix} E_{o,s\downarrow} \\ E_{o,p\downarrow} \end{bmatrix} = (OPE_{\downarrow\downarrow} AR_{\downarrow\downarrow} OPE_{\downarrow\leftarrow} AR_{\leftarrow\leftarrow} OPE_{\leftarrow\leftarrow} + OPE_{\downarrow\leftarrow} AR_{\leftarrow\leftarrow} OPE_{\leftarrow\downarrow} AR_{\downarrow\downarrow} OPE_{\downarrow\leftarrow}) \begin{bmatrix} E_{i,s} \\ E_{i,p} \end{bmatrix} \quad \text{Eq. 8}$$

However, this may be simplified if the phase retardation (the difference between phase shifts of each of the s and p light paths at each bounce) is 0, such that ($\theta_s=\theta_p$). In this case, the anti-reflective coating no longer impacts the energy output. In other words, Eq. 6 and Eq. 7 may be replaced, respectively by:

$$AR_{\downarrow\downarrow} = e^{j\theta_{\downarrow\downarrow}} \begin{bmatrix} 1 & 0 \\ 0 & 1 \end{bmatrix} \quad \text{Eq. 9}$$

$$AR_{\leftarrow\leftarrow} = e^{j\theta_{\leftarrow\leftarrow}} \begin{bmatrix} 1 & 0 \\ 0 & 1 \end{bmatrix} \quad \text{Eq. 10}$$

And the output is simplified to:

$$\begin{bmatrix} E_{o,s\downarrow} \\ E_{o,p\downarrow} \end{bmatrix} = \quad \text{Eq. 11}$$

-continued $$e^{j\theta_{\downarrow\downarrow}} e^{j\theta_{\leftarrow\leftarrow}} (OPE_{\downarrow\downarrow} OPE_{\downarrow\leftarrow} OPE_{\leftarrow\leftarrow} + OPE_{\downarrow\leftarrow} OPE_{\leftarrow\downarrow} OPE_{\downarrow\leftarrow}) \begin{bmatrix} E_{i,s} \\ E_{i,p} \end{bmatrix}$$

Figure 7:
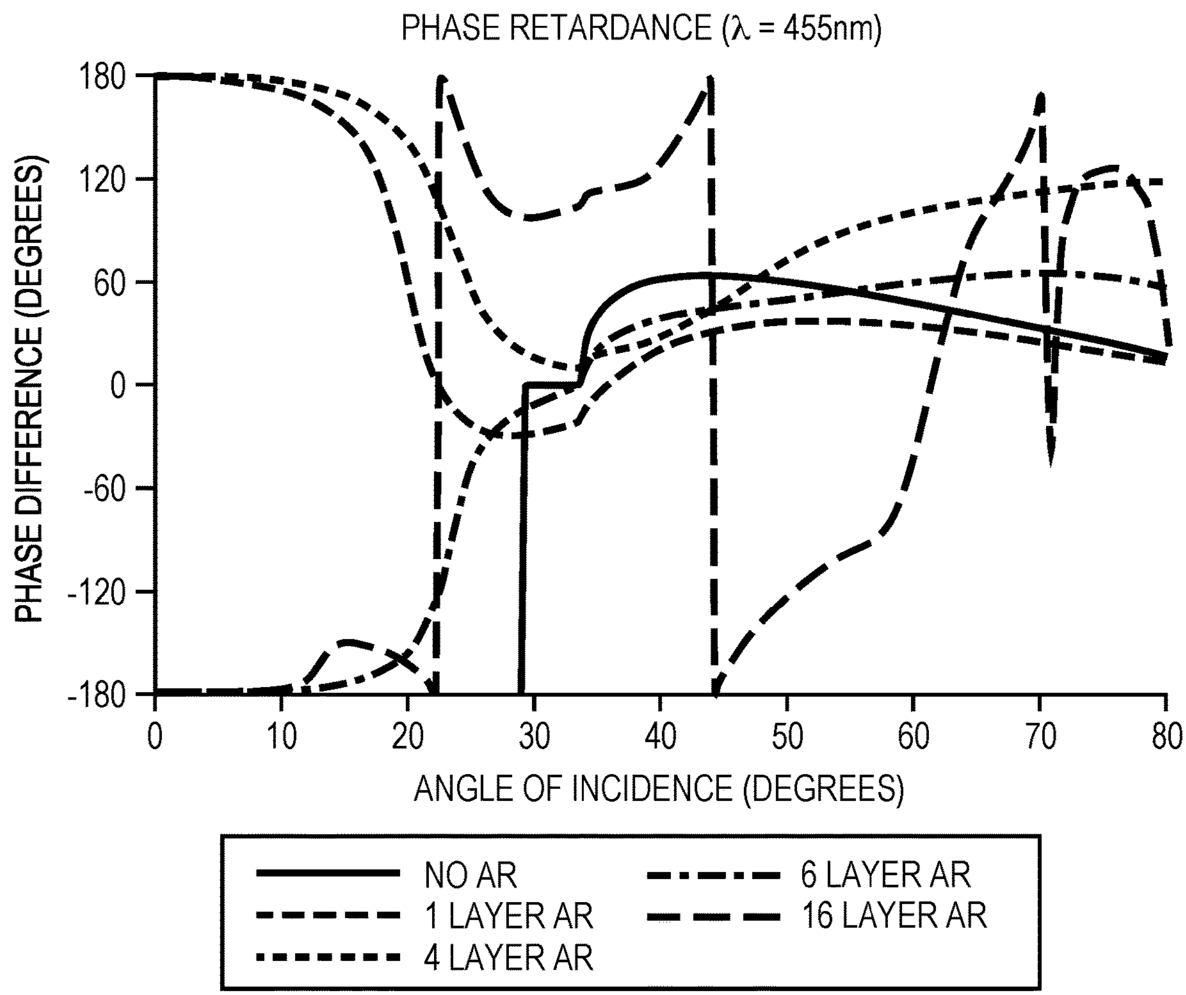
FIG. 7 is a graph illustrating a phase retardation relationship as a function of layers in an anti-reflective coating according to some embodiments.
Figure 8A:
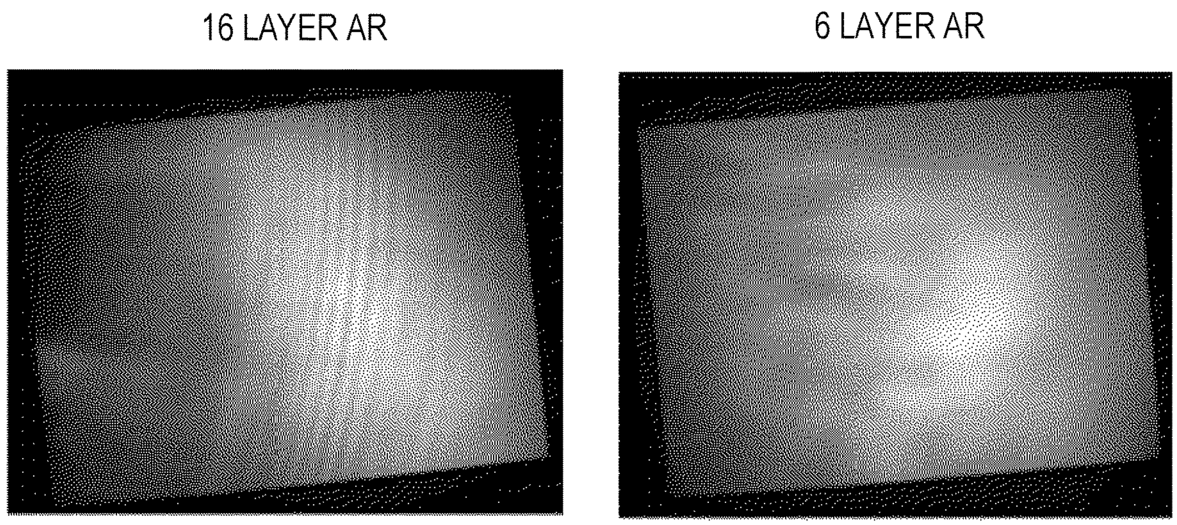
FIG. 8A shows captured images of an eyepiece design for blue (455 nm) light on substrates with different n values of layers of an anti-reflective coating.
Figure 8B:
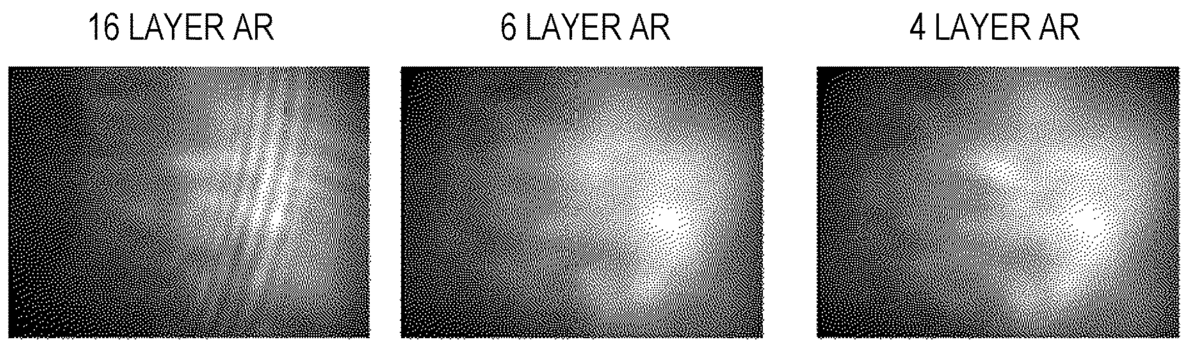
FIG. 8B shows simulated images of an eyepiece design for blue (455 nm) light on substrates with different n values of layers of an anti-reflective coating.
Figure 8C:
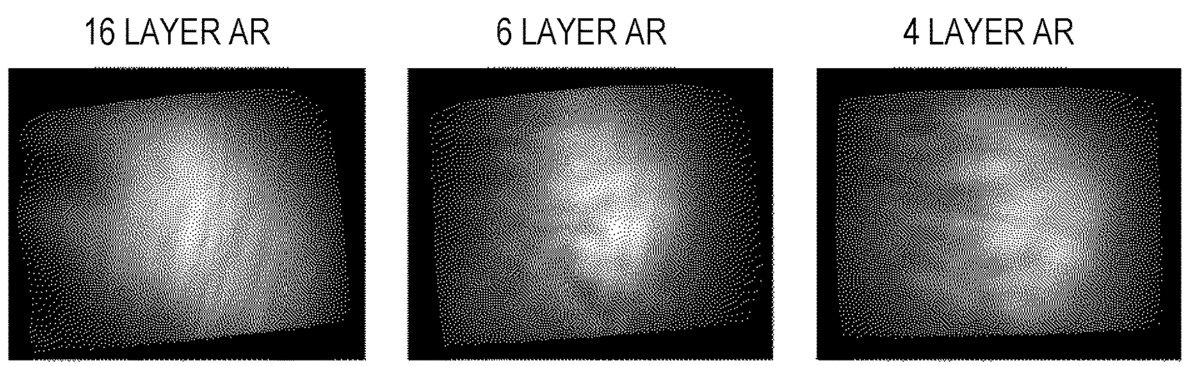
FIG. 8C shows captured images of an eyepiece design for red (625 nm) light on substrates with different n values of layers of an anti-reflective coating.
Figure 8D:
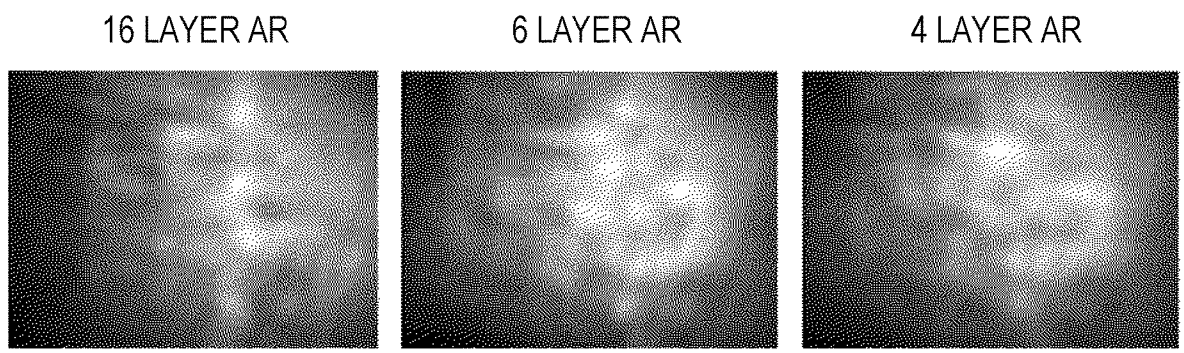
FIG. 8D shows simulated images of an eyepiece design for red (625 nm) light on substrates with different n values of layers of an anti-reflective coating.

Therefore, if the AR coating has no phase retardation, it only imparts a phase shift to the output, with no change of polarization state or magnitude. If the AR coating does have phase retardation, it will change the output polarization state and magnitude, and introduce negative optical effects. This is critical when determining the number of layers of an anti-reflective coating used on a TIR waveguide display device. FIG. 7 depicts the phase retardation for TIR light at various angles of incidence. FIG. 8A shows captured images of an eyepiece design for blue (455 nm) light on substrates with different n values of layers of an anti-reflective coating. FIG. 8B shows simulated images of an eyepiece design for blue (455 nm) light on substrates with different n values of layers of an anti-reflective coating. FIG. 8C shows captured images of an eyepiece design for red (625 nm) light on substrates with different n values of layers of an anti-reflective coating. FIG. 8D shows simulated images of an eyepiece design for red (625 nm) light on substrates with different n values of layers of an anti-reflective coating. Large variation in phase difference impact the exit beams, observable as "striations" or uniformity disruptions depicted in FIGS. 8A-8D. A four-layer anti-reflective coating is found to have the most uniformity and is thus preferred over the other coatings that are represented in FIGS. 7 and 8A-8D. It will be appreciated that the effects of adjusting the number of anti-reflective layers are consistent across each wavelength, that is, though FIGS. 8A-8D depict eyepieces for particular wavelengths of light the effect is similar for other wavelengths (such as green) that are not shown.

To minimize this degradation and reduce the amount of inter-waveguide reflections while nonetheless maintaining intra-waveguide reflections, embodiments of the present invention are directed to an optimized anti-reflective coating. Such optimization balances the index of refraction of the anti-reflective material with the number and thickness of layers applied in the coating. This will minimize the phase retardation effects by bringing $\theta_s$ substantially equal to $\theta_p$.

In some embodiments an anti-reflective coating is applied to one side of a waveguide substrate within a waveguide stack that makes up an eyepiece of an augmented or mixed or virtual reality device. Preferably, the coated side is on the opposing side a viewer's eye is expected to be placed, though a coated side on a same side as a viewer's eye may function similarly. In some embodiments, a grating is applied to the opposite surface of the waveguide as the coated side. The anti-reflective coating preferably reduces reflection from and increases transmission through the surface to which the anti-reflective coating is applied. The anti-reflective coating preferably increases transmission of light to at least 97 percent.

The antireflection coating comprises at least one layer, but in preferred embodiments is less than eight and alternates layers of two alternating constituent materials of comparatively high and comparatively low indices of refraction. In some embodiments, one of the constituent layers is titania ($TiO_2$). In some embodiments, one of the constituent layers is silica ($SiO_2$).

One of skill in the art will appreciate other candidate materials, such as SiN, $ZrO_2$, $ZnO_2$, $Ta_2O_5$, or $NB_2O_5$ or other metal oxides with low absorption in visible wavelength range. Such materials, as with $TiO_2$ and $SiO_2$, are well known in the art for their use in the photovoltaic or glass treatment for anti-reflection.

In some embodiments, $SiO_2$ is a final (i.e. top) layer of a multilayer coating as a protective layer to any wet chemistry (sulfuric acid, hydrogen peroxide, etc.) incident to waveguide cleaning, processing or patterning.

An index of refraction, n, of a material is composed from two elements, the known refractive index and the absorption coefficient k (or imaginary index of refraction that relates to the attenuation of light through the material) such that n=n+ik. Different materials have different absorption coefficients that can produce widely various results, and this is especially variable when multiple materials are layered together to create a net k value for the coating. For example, titania, a well know anti-reflective material, and silicon nitride SiN have similar reflectance spectrums for normal incidence, but slightly different k values. Though these may be negligible in normal/orthogonal light directions, at angles supporting TIR every bounce of the light at a surface is attenuated with a slightly different absorption as compared between the two materials. The cumulative effect of this slight difference of absorption coefficient in a coating that manipulates light across a plurality of bounces in a TIR system can drastically affect the overall image quality, especially uniformity and efficiency.

Figure 9A:
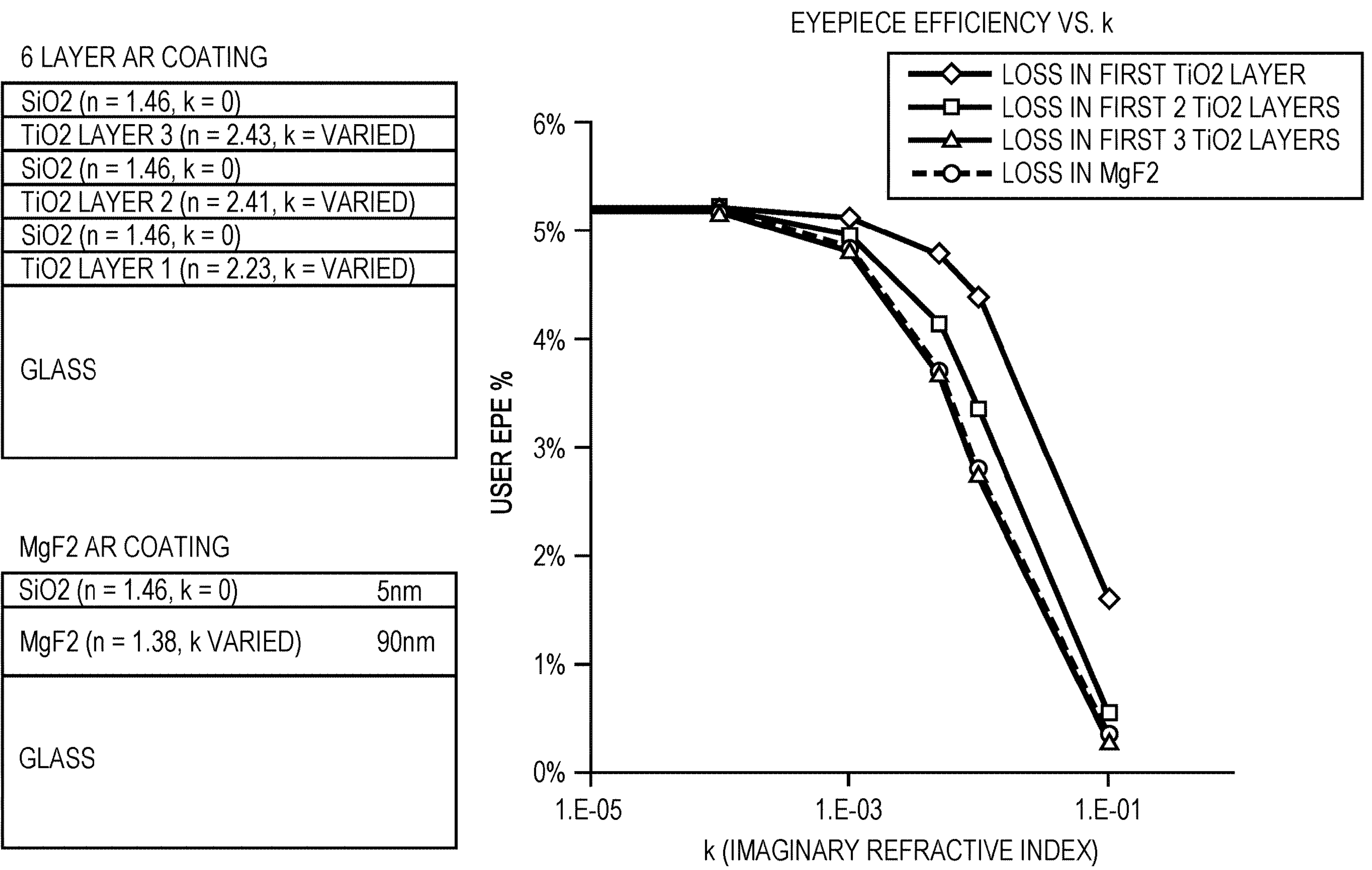
FIGS. 9A-9D are graphs that illustrate efficiency decay of light energy output by a waveguide as a function of the number of layers and k value of an anti-reflective coating according to some embodiments.
Figure 9B:
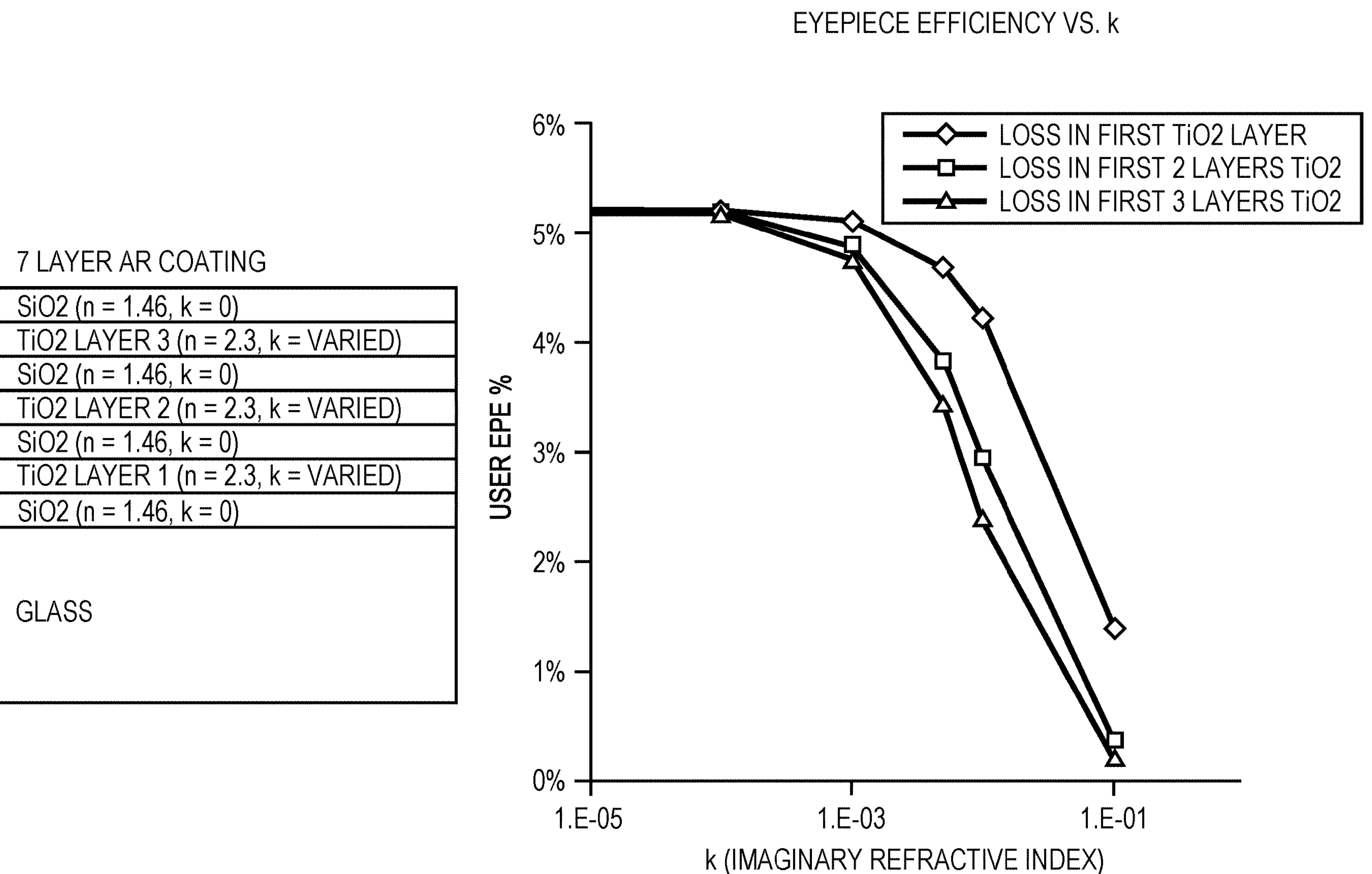
Figure 9C:
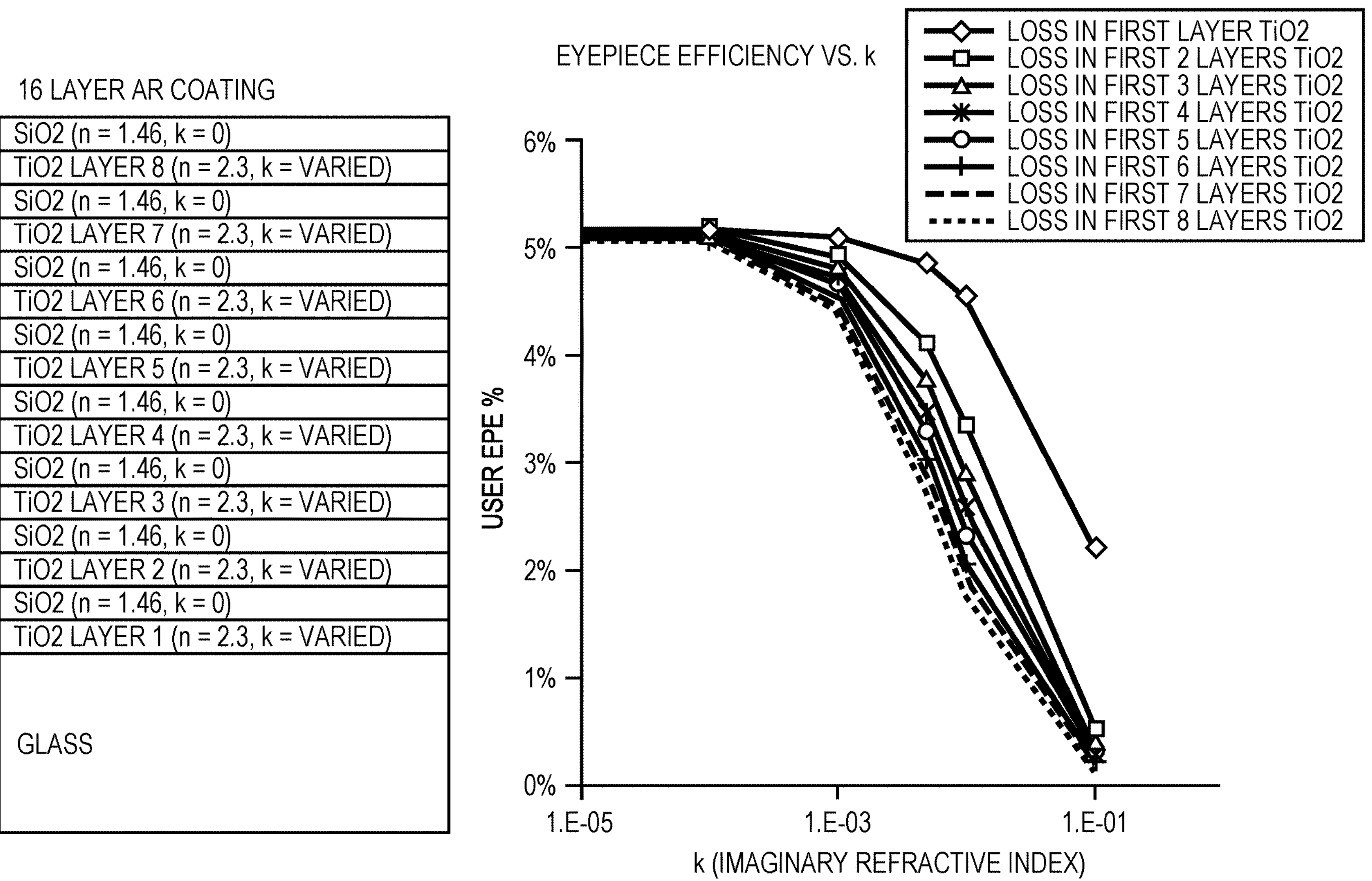

Using the energy output by materials of varying absorption coefficients k of various materials, the loss of light, as a percentage of output, is depicted in FIGS. 9A-9D. FIG. 9A depicts the loss of energy of light output by the EPE as a function of increasing layers and increasing k values. With an exemplary EPE efficiency of five percent as depicted, most single layer anti-reflective coatings preserve this efficiency in a TIR system, such as an optical waveguide, when the net k value is less than approximately $5\times10^{-4}$. Each additional layer or increase in net k value exponentially decays the efficiency of the energy output at the EPE. This is true regardless of the material or the number of layers, though the degree of decay changes as shown by FIGS. 9B and 9C.

Figure 9D:
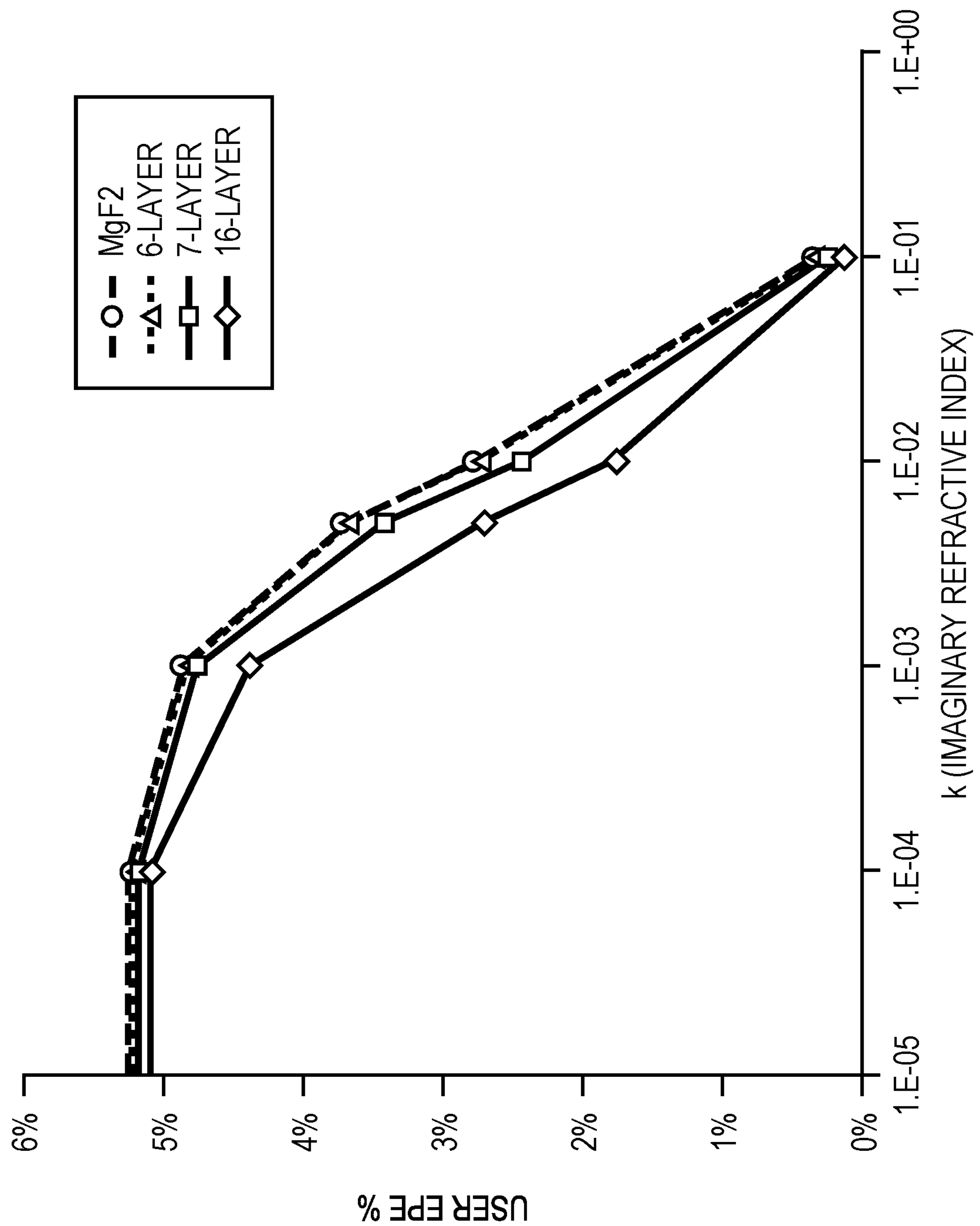

FIG. 9D depicts an EPE efficiency diagram demonstrating that increased layers, despite any benefits to anti-reflection known in the art, are detrimental to system performance through increased loss.

In some embodiments, anti-reflective coatings with fewer than eight layers are utilized. In some embodiments, such as an $MgF_2$ coating, only a single layer is utilized.

According to Eq. 1, a target index of refraction may be resolved by simple math, however the cumulative effect of a particular k value is not so easily derived, and in an alternating layer coating the cumulative target n may not be so straightforward either. For example, if a conventional anti-reflective coating material like titania were applied to a glass substrate, Eq.1 would not be satisfied. Glass generally has an index of refraction between 1.5 and 1.6, an anti-reflective coating on glass therefore should have an index of refraction between 1.22 and 1.27. In some embodiments of the present invention, an antireflection coating of MgF2 is applied (the index of refraction of $MgF_2$ is 1.38) to a glass substrate.

With reference to FIG. 3, multiple waveguides may be used, such that each waveguide is configured to propagate a particular wavelength of light. A distinct thickness for an anti-reflective coating for each waveguide may be created based on the configured wavelength of that waveguide. For example, in a MgF2 coating on glass configured to propagate green light (approximately 520 nm), a thickness of 94 nm is desired. Alternatively, a common thickness for any waveguide (to save on manufacturing application complexity) between 75 nm and 125 nm can be applied for single layered coatings to reflect the visible spectrum generally, with the understanding that the exact thickness selected will be more beneficial for the particular wavelength of light dictated by Eq. 2.

Reference throughout this document to "one embodiment," "certain embodiments," "an embodiment," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one," "at least one" or "one or more." Unless otherwise required by context, singular terms used herein shall include pluralities and plural terms shall include the singular.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." The term "or" as used herein is to be interpreted as inclusive or meaning any one or any combination. Therefore, "A, B or C" means any of the following: A; B; C; A and B; A and C; B and C; A, B and C. An exception to this definition will occur only when a combination of elements, functions, steps or acts are in some way inherently mutually exclusive.

Words using the singular or plural number also include the plural and singular number, respectively. Additionally, the words "herein," "above," and "below" and words of similar import, when used in this disclosure, shall refer to this disclosure as a whole and not to any particular portions of the disclosure.

The description of embodiments of the disclosure is not intended to be exhaustive or to limit the disclosure to the precise form disclosed. While specific embodiments and examples for the disclosure are described herein for illustrative purposes, various equivalent modifications are possible within the scope of the disclosure, as those skilled in the relevant art will recognize. Such modifications may include, but are not limited to, changes in the dimensions and/or the materials shown in the disclosed embodiments.

All of the references cited herein are incorporated by reference. Aspects of the disclosure can be modified, if necessary, to employ the systems, functions, and concepts of the above references to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. An anti-reflective waveguide, comprising:

a planar waveguide substrate having a first index of refraction, the planar waveguide substrate being transparent and having first and second opposing surfaces;

a plurality of diffractive optical elements disposed upon the first surface of the waveguide, the second surface opposing the first surface being flat; and an anti-reflective coating disposed upon the second surface of the waveguide, wherein the waveguide is planar and configured to propagate light by total internal reflection between the plurality of diffractive optical elements and the anti-reflective coating in a substantially first direction, and outcouple light in a second direction substantially orthogonal to the first direction, wherein the light propagating by total internal reflection comprises an s polarization component and a p polarization component, wherein the anti-reflective coating is configured to reduce phase retardation between the two components such that an angle of incidence of the s component is substantially similar to that of the p component through the waveguide for a select color of the light, the anti-reflective coating being transparent and improving transmission of light therethrough.

2. The anti-reflective waveguide of claim 1, wherein anti-reflective coating has no phase retardation, it only imparts a phase shift to the output, with no change of polarization state or magnitude.

3. The anti-reflective waveguide of claim 2, wherein:

$$\begin{bmatrix} E_{o,s\downarrow} \\ E_{o,p\downarrow} \end{bmatrix} = e^{j\theta_{\downarrow\downarrow}} e^{j\theta_{\leftarrow\leftarrow}} (OPE_{\downarrow\downarrow} OPE_{\downarrow\leftarrow} OPE_{\leftarrow\leftarrow} + OPE_{\downarrow\leftarrow} OPE_{\leftarrow\downarrow} OPE_{\downarrow\leftarrow}) \begin{bmatrix} E_{i,s} \\ E_{i,p} \end{bmatrix}.$$

4. The anti-reflective waveguide of claim 2, wherein select color has a first wavelength light the reduce phase retardation is similar for the first wavelength and for a second wavelength that is different from the first wavelength.

5. The anti-reflective waveguide of claim 1, wherein the anti-reflective coating reduces reflection from and increases transmission of light through the second surface into the waveguide.

6. The anti-reflective waveguide of claim 5, wherein at least 97 percent of the light is transmitted through the second surface.

7. The anti-reflective waveguide of claim 1, wherein the waveguide substrate is glass and the anti-reflective coating comprises a layer of $MgF_2$.

8. The anti-reflective waveguide of claim 7, wherein the layer of $MgF_2$ has a thickness between 75 and 125 nm.

9. The anti-reflective waveguide of claim 7, wherein the anti-reflective coating comprises a layer of $SiO_2$.

10. The anti-reflective waveguide of claim 8, wherein the layer of $MgF_2$ is disposed immediately adjacent to the second surface.

11. The anti-reflective waveguide of claim 10, wherein a layer of $SiO_2$ is disposed upon the layer of $MgF_2$.

12. The anti-reflective waveguide of claim 11, wherein a cumulative index of refraction of the anti-reflective coating has an imaginary refractive index component value less than $5\times10^{-4}$.

13. The anti-reflective waveguide of claim 11, wherein a cumulative index of refraction of the anti-reflective coating has an imaginary refractive index component value between $5\times10^{-4}$ and $1\times10^{-3}$.

14. The anti-reflective waveguide of claim 1, wherein the anti-reflective coating is comprised less than eight layers alternating between a first material and a second material.

15. The anti-reflective waveguide of claim 14, wherein the anti-reflective coating consists of four layers.

16. The anti-reflective waveguide of claim 14, wherein the first material has comparatively higher index of refraction than the second material.

17. The anti-reflective waveguide of claim 14, wherein the first material is $TiO_2$.

18. The anti-reflective waveguide of claim 14, wherein each layer of $TiO_2$ has an index of refraction greater than 2.

19. The anti-reflective waveguide of claim 14, wherein the second material is $SiO_2$.

20. The anti-reflective waveguide of claim 19, wherein each layer of $SiO_2$ has an index of refraction between 1.45 and 1.58.

21. The anti-reflective waveguide of claim 20, wherein a cumulative index of refraction of the anti-reflective coating has an imaginary refractive index component value less than $5\times10^{-4}$.

22. The anti-reflective waveguide of claim 20, wherein a cumulative index of refraction of the anti-reflective coating has an imaginary refractive index component value between $5\times10^{-4}$ and $1\times10^{-3}$.

23. The anti-reflective waveguide of claim 1, wherein a cumulative index of refraction of the anti-reflective coating has an imaginary refractive index component value less than $5\times10^{-4}$.

24. An anti-reflective waveguide, comprising:

a planar waveguide substrate having a first index of refraction;

a plurality of diffractive optical elements disposed upon a first surface of the waveguide; and an anti-reflective coating disposed upon a second surface of the waveguide, wherein the waveguide is planar and configured to propagate light by total internal reflection between the plurality of diffractive optical elements and the anti-reflective coating in a substantially first direction, and outcouple light in a second direction substantially orthogonal to the first direction, wherein the light propagating by total internal reflection comprises an s polarization component and a p polarization component, wherein the anti-reflective coating is configured to reduce phase retardation between the two components such that an angle of incidence of the s component is substantially similar to that of the p component through the waveguide for a select color of the light, wherein anti-reflective coating has no phase retardation, it only imparts a phase shift to the output, with no change of polarization state or magnitude and $$\begin{bmatrix} E_{o,s\downarrow} \\ E_{o,p\downarrow} \end{bmatrix} = e^{j\theta_{\downarrow\downarrow}} e^{j\theta_{\leftarrow\leftarrow}} (OPE_{\downarrow\downarrow} OPE_{\downarrow\leftarrow} OPE_{\leftarrow\leftarrow} + OPE_{\downarrow\leftarrow} OPE_{\leftarrow\downarrow} OPE_{\downarrow\leftarrow}) \begin{bmatrix} E_{i,s} \\ E_{i,p} \end{bmatrix}.$$

25. An anti-reflective waveguide, comprising:

a planar waveguide substrate comprising a layer of glass having a first index of refraction;

a plurality of diffractive optical elements disposed upon a first surface of the waveguide; and an anti-reflective coating comprising a layer of $MgF_2$ disposed upon a second surface of the waveguide, wherein the waveguide is planar and configured to propagate light by total internal reflection between the plurality of diffractive optical elements and the anti-reflective coating in a substantially first direction, and outcouple light in a second direction substantially orthogonal to the first direction, wherein the light propagating by total internal reflection comprises an s polarization component and a p polarization component, wherein the anti-reflective coating is configured to reduce phase retardation between the two components such that an angle of incidence of the s component is substantially similar to that of the p component through the waveguide for a select color of the light.

* * * * *